US010878347B2

(12) United States Patent
Okamoto

(10) Patent No.: US 10,878,347 B2
(45) Date of Patent: Dec. 29, 2020

(54) SERVICE STATUS MANAGEMENT SYSTEM

(71) Applicant: ASAHI KASEI KABUSHIKI KAISHA, Tokyo (JP)

(72) Inventor: Akihiro Okamoto, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/469,871

(22) PCT Filed: Dec. 14, 2017

(86) PCT No.: PCT/JP2017/044962
§ 371 (c)(1),
(2) Date: Jun. 14, 2019

(87) PCT Pub. No.: WO2018/110663
PCT Pub. Date: Jun. 21, 2018

(65) Prior Publication Data
US 2019/0318279 A1  Oct. 17, 2019

(30) Foreign Application Priority Data
Dec. 15, 2016  (JP) .................. 2016-243266

(51) Int. Cl.
G06Q 10/02 (2012.01)
G06K 7/10 (2006.01)
(Continued)

(52) U.S. Cl.
CPC ......... *G06Q 10/02* (2013.01); *G06K 7/10722* (2013.01); *G06K 7/1413* (2013.01);
(Continued)

(58) Field of Classification Search
CPC .... G06Q 10/02; G06Q 50/10; G06K 7/10722; G06K 7/1413; G06K 7/1417; H04N 5/272; H04N 5/445
See application file for complete search history.

(56) References Cited

U.S. PATENT DOCUMENTS

2016/0275419 A1* 9/2016 Morita ............... G06Q 30/0625

FOREIGN PATENT DOCUMENTS

JP     2003-99514 A    4/2003
JP    2006-222482 A    8/2006
(Continued)

OTHER PUBLICATIONS

International Search Report issued in corresponding International Patent Application No. PCT/JP2017/044962 dated Feb. 20, 2018.
(Continued)

Primary Examiner — Tat C Chio
(74) Attorney, Agent, or Firm — Morgan, Lewis & Bockius LLP

(57) ABSTRACT

A service status management system includes a capturing unit to capture an image of the inside of a facility, an object registering unit register a service object, an object detecting unit to detect the service object registered in the object registering unit in the captured image, a time limit setting unit to set a time limit of a validity period that starts at a time point when the object detecting unit detected the service object for the first time, an image generating unit to generate an image that includes a time limit area capable of displaying a time limit information image and a facility image area displaying a facility image representing the state of the facility, the image being a notification image notifying the status of a service to an external terminal device, and a notification image transmitting unit to transmit the notification image to the terminal device.

7 Claims, 13 Drawing Sheets

(51) Int. Cl.
G06K 7/14 (2006.01)
H04N 5/272 (2006.01)
H04N 5/445 (2011.01)

(52) U.S. Cl.
CPC .......... *G06K 7/1417* (2013.01); *H04N 5/272* (2013.01); *H04N 5/445* (2013.01)

(56) References Cited

FOREIGN PATENT DOCUMENTS

| | | |
|---|---|---|
| JP | 2011-210125 A | 10/2011 |
| JP | 2011-248813 A | 12/2011 |
| JP | 2011-253424 A | 12/2011 |
| JP | 5060047 B2 | 10/2012 |
| JP | 2014-160963 A | 9/2014 |
| JP | 2015-036904 A | 2/2015 |
| JP | 2016-177775 A | 10/2016 |
| JP | 2016-186732 A | 10/2016 |
| JP | 2017-130029 A | 7/2017 |

OTHER PUBLICATIONS

International Preliminary Report on Patentability dated Jun. 18, 2019, for the corresponding International Application No. PCT/JP2017/044962.

\* cited by examiner

| BAR CODE | CHARACTER INFORMATION | SERVICE CONTENT | VALIDITY PERIOD LENGTH |
|---|---|---|---|
| 131 | No.1 | RESERVATION | 5 MINUTES |
| 133 | No.2 | RESERVATION | 7 MINUTES |
| 135 | No.3 | DISCOUNT | 30 MINUTES |

RESERVATION: 300 SECONDS REMAINING

SERVICE STATUS MANAGEMENT SYSTEM

TECHNICAL FIELD

The present invention relates to a service status management system.

BACKGROUND ART

There is conventionally known a system that displays a state of the inside of a predetermined facility on terminals connected by a network (for example, PTL 1). Additionally, there is also known a system that transmits a sales promotion e-mail describing a time service for providing a discount to those who visit in a predetermined time zone where there are sufficient empty seats to mobile phones of customers who have visited before in the predetermined time zone (for example, PTL 2). However, in the conventional systems, accuracy in service status notification to potential visitors (prospective customers) and service status management on the facility side have been insufficient.

CITATION LIST

Patent Literature

PTL 1: JP Pat. No. 5060047
PTL 2: JP 2003-99514 A

SUMMARY OF INVENTION

Technical Problem

It is an object of the present invention to provide a service status management system that can improve accuracy in service status notification to potential visitors and service status management on the facility side.

Solution to Problem

To achieve the object, a service status management system according to one aspect of the present invention includes:

a capturing unit configured to capture an image of an inside of a facility;

an object registering unit configured to previously register a service object linked to service information including a service to be provided in the facility and a validity period of the service;

an object detecting unit configured to detect the service object registered in the object registering unit in a captured image captured by the capturing unit;

a time limit setting unit configured to set a time limit of the validity period that starts at a time point when the object detecting unit detected the service object for the first time;

an image generating unit configured to generate an image including a time limit area capable of displaying a time limit information image representing information relating to the time limit and a facility image area displaying a facility image representing a state of the facility, the image to be generated being a notification image notifying a status of the service to an external terminal device; and a notification image transmitting unit configured to transmit the notification image generated by the image generating unit to the terminal device.

Advantageous Effects of Invention

According to the one aspect of the present invention, there can be provided a service status management system that can improve accuracy in service status notification to potential visitors and service status management on the facility side.

DESCRIPTION OF EMBODIMENTS

Hereinafter, service status management systems according to modes for implementing the present invention (hereinafter referred to as "embodiments") will be described using FIG. 1 to FIG. 15.

First Embodiment

Figure 1:
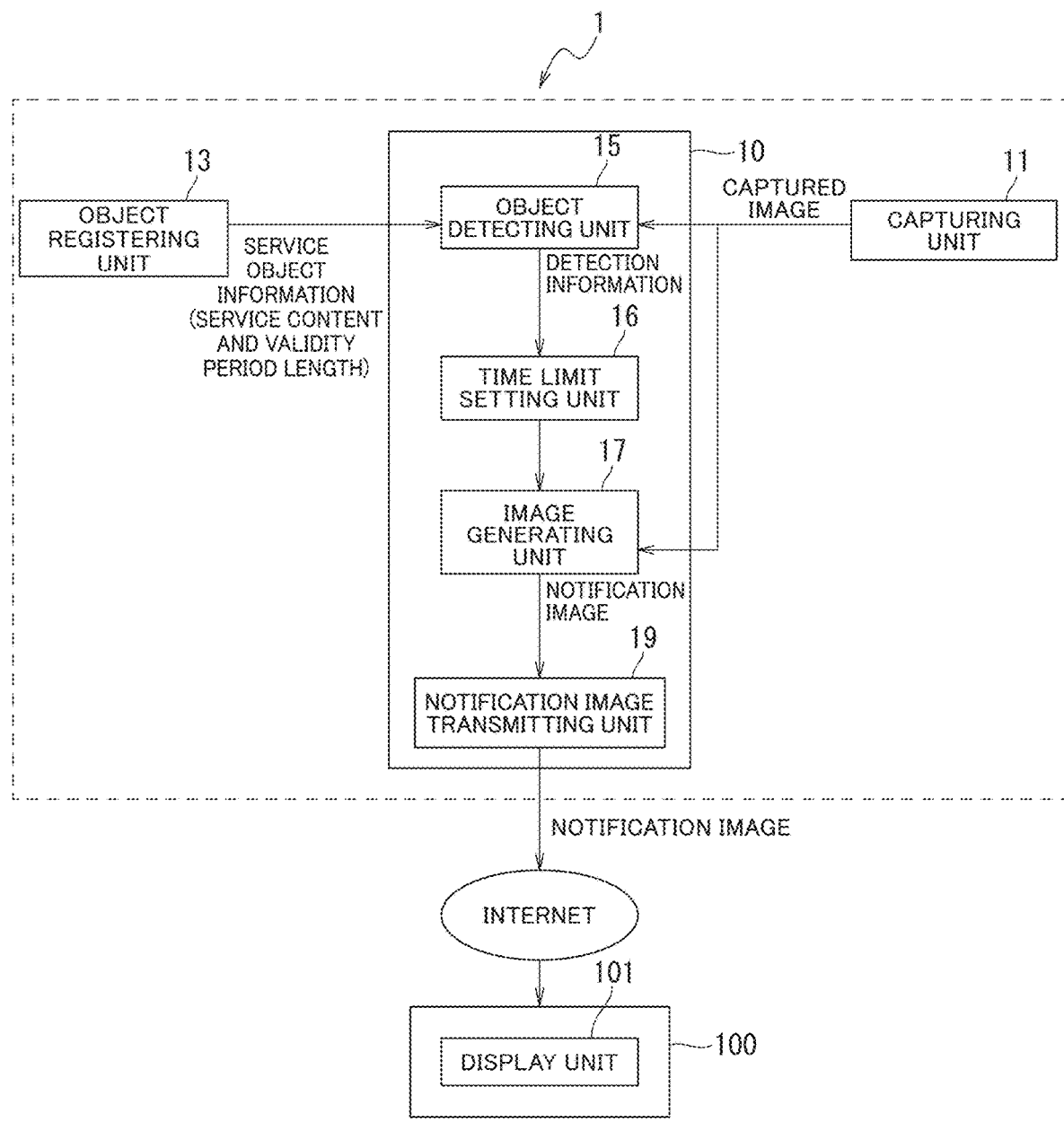
FIG. 1 is a structural diagram for describing a service status management system according to a first embodiment of the present invention.

First, a description will be given of a first embodiment according to the present invention. FIG. 1 is a block diagram illustrating one example of a functional structure of a service status management system 1 according to the present embodiment. The service status management system 1 is a system configured to manage information relating to statuses of services such as reservations and discounts provided by a facility (for example, a store such as a restaurant), and also notify the information to a prospective visitor who have made reservation or a potential visitor who "desires to visit if there is an empty seat in the facility" or "desires to visit if there is a discount".

(Structure of Service Status Management System)

As illustrated in FIG. 1, the service status management system 1 includes a processing unit 10. The processing unit 10 is configured such that a software program is deployed on, for example, a predetermined computer (hereinafter referred to as "processing computer"), and a CPU of the processing computer exerts computation processing in response to a command of the software program. The processing computer may be a computer (for example, microcomputer) incorporated in a camera used as a capturing unit 11 to be described later, a computer (for example, personal computer) installed in the facility, or a computer located outside the facility (for example, server computer). Additionally, pieces of processing to be performed by the processing unit 10 may be decentralized by using these computers in combination.

The service status management system 1 includes the capturing unit 11 configured to capture an image of the inside of the facility. The capturing unit 11 is, for example, a camera capable of forwarding a captured image to a computer or the like in real time, and is connected to be communicable with the processing computer. The capturing unit 11 is installed at a position where the inside of the facility can be widely included within a composition. Herein, the facility captured by the capturing unit 11 is assumed to be, for example, a restaurant or the like.

The service status management system 1 includes an object registering unit 13 configured to previously register a service object linked to service information including a service to be provided in the facility (such as a restaurant captured by the capturing unit 11) and a validity period of the service. The object registering unit 13 is, for example, a predetermined storage area on the processing computer, such as a memory. Examples of the service linked to the service object include a reservation service in which the restaurant side keeps a table in advance for a customer who has promised to come to the store (prospective visitor) and a discount service where the restaurant side reduces prices of food, products, and the like to invite a potential customer (potential visitor) who is likely to come to the store. Hereinafter, the store (facility) that provides these services is referred to as service providing facility. In addition, a person (such as an employee or a storekeeper) who provides such a service in the service providing facility is referred to as service provider.

Additionally, the validity period of the service is a period previously set by the service provider, and refers to a period in which the service provided by the service provider is available to a potential visitor or a visitor. For example, the validity period of a reservation service is a period in which a table is kept for a prospective visitor who made the reservation in the service providing facility. In addition, the validity period of a discount service is a period in which a visitor can enjoy activities such as eating and drinking and product purchasing at a discount from a normal price in the service providing facility.

The service object registered in the object registering unit 13 is linked to a service provided by the service providing facility. The service object represents a service (such as a reservation service or a discount service) provided by the service providing facility. For example, the service object may be a panel where a bar code (one-dimensional bar code or two-dimensional bar code) representing, numerical value(s) or character(s) is printed on a surface thereof, a sign panel such as a road sign where a design (pattern) identifiable by color and figure is printed on a surface thereof, or a panel where symbol(s) and/or character(s) understandable by persons are described. Alternatively, the service object may be a pylon or a road cone identifiable by color and shape, or a doll or a figurine having a specific shape or design.

In addition, the service status management system 1 is configured to be communicable with an external terminal device 100 via the Internet. The terminal device 100 is a terminal device to be viewed by each of an unspecified number of potential visitors who are expected to use the service providing facility. The terminal device 100 may be a mobile phone (including a smartphone), a tablet type terminal device, a personal computer, or the like, or may be a display device (digital signage) connected by a wired network. The personal computer may be a notebook personal computer, a desktop personal computer, or the like.

Next will be a description of each structure of the processing unit 10.

The service status management system 1 includes an object detecting unit 15 configured to detect the service object registered in the object registering unit 13 in a captured image captured by the capturing unit 11. For example, when the service object registered in the object registering unit 13 is a sign panel, the object detecting unit 15 removes noise by using color information of the sign panel, and performs a pattern recognition using Hough transform on simple figures printed on the sign panel, as in detection of a road sign.

In this way, the object detecting unit 15 can highly accurately detect the sign panel.

Alternatively, for example, when the service object registered in the object registering unit 13 is a panel with a bar code printed thereon, the object detecting unit 15 uses bar code reading software (for example, "ZBAR" that is open source software). The bar code reading software is software that reads a plurality of bar codes such as JAN code classified as a one-dimensional bar code and QR code (registered trademark) classified as a two-dimensional bar code, and feeds back information (the type of the bar code, character information written in the bar code, and the like) included in the bar code, as reading results. The present embodiment will describe a case where the service object is a two-dimensional bar code.

Some service objects are registered in the object registering unit 13. The object detecting unit 15 detects one of the service objects in the captured image, and then outputs information (detection information) relating to the detected service object to a time limit setting unit 16 to be described later.

Figures 2, 3:
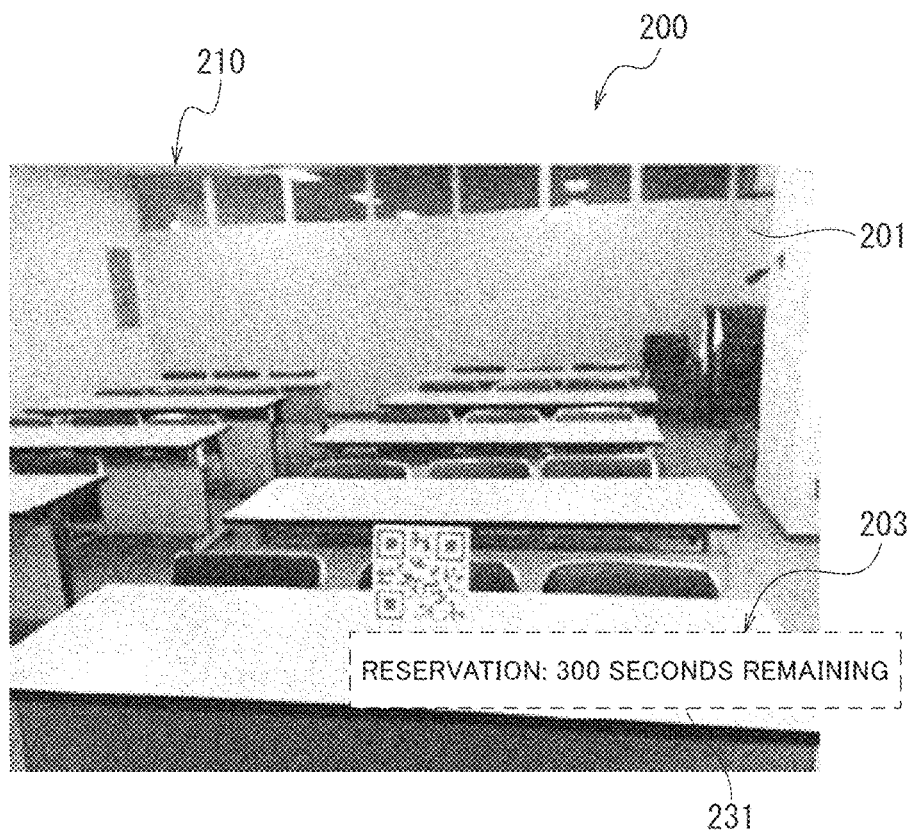
FIG. 2 is a diagram representing a list of service objects registered in an object registering unit.
FIG. 3 is a diagram illustrating one example of a notification image.

Now, one example of the service objects registered in the object registering unit 13 will be described using FIG. 2. FIG. 2 is a diagram representing a list of the service objects registered in the object registering unit 13. In FIG. 2, "BAR CODE" represent images of two-dimensional bar codes, which are service objects in the present embodiment. To facilitate understanding, the present example will describe, as each service object, a two-dimensional bar code printed on a panel surface. Additionally, "CHARACTER INFORMATION" represents character information (including numerical values and symbols) included in the two-dimensional bar codes. In addition, "SERVICE CONTENT" represents the content of each service linked to each of the two-dimensional bar codes that are the service objects. Furthermore, "VALIDITY PERIOD LENGTH" represents the length of a validity period of each service. The service contents set in the column of "SERVICE CONTENT" and the lengths of validity periods set in the column of "VALIDITY PERIOD LENGTH" are respectively linked to three two-dimensional bar codes (service objects 131, 133, and 135) in the column of "BAR CODE", and are referred to via the character information in the column of "CHARACTER INFORMATION".

In the example illustrated in FIG. 2, "reservation" in the column of "SERVICE CONTENT" and "5 minutes" in the column of "VALIDITY PERIOD LENGTH" are linked to the service object 131. This indicates that the service object 131 is an object linked to a reservation service "reservation" whose validity period length (a time period during which a table is kept for a prospective visitor) is 5 minutes. In addition, "reservation" in the column of "SERVICE CONTENT" and "7 minutes" in the column of "validity period length" are linked to the service object 133. This indicates that the service object 133 is an object linked to a reservation service "reservation" whose validity period length (a table keeping time period) is 7 minutes. Furthermore, "discount" in the column of "SERVICE CONTENT" and "30 minutes" in the column of "validity period length" are linked to the service object 135. This indicates that the service object 135 is an object linked to a discount service "discount" whose validity period length (a time period during which meal, purchase and etc. can be made at a discount rate) is 30 minutes.

As described above, the two-dimensional bar codes include the character information (including numerical values and symbols), so that the object detecting unit 15 can acquire the character information included in each of the bar codes by using bar code reading software. Thus, when the character information included in the two-dimensional bar codes of the service objects 131, 133, and 135 is registered in the object registering unit 13, the object detecting unit 15 can detect the two-dimensional bar codes that are the service objects by using the bar code reading software, and then can acquire contents shown in the column of "SERVICE CONTENT" and the column of "validity period length" via the character information shown on the column of "character information" of FIG. 2. When the service objects are the two-dimensional bar codes, the bar code reading software performs image processing, so that it is unnecessary to register the two-dimensional bar code images themselves in the object registering unit 13. Note that the service status management system 1 may be assumed to use information on linkage between the service objects and the service contents in any structure other than the object detecting unit 15. When registering each service object in the object registering unit 13, there may be assumed, for example, a method of registering the image thereof itself, a method of extracting and registering a feature amount of the image thereof, and the like. The present embodiment will describe a case where the object registering unit 13 stores a table including three columns of the "CHARACTER INFORMATION", the "SERVICE CONTENT", and the "VALIDITY PERIOD LENGTH" in the list illustrated in FIG. 2 as a service object registration table.

Returning to FIG. 1, the service status management system 1 includes the time limit setting unit 16 configured to set a time limit of the validity period of a service (hereinafter referred to as "service validity time limit") that on the basis of a time point when the object detecting unit 15 detected the service object for the first time. In addition, the service status management system 1 includes an image generating unit 17 configured to generate an image including a time limit area capable of displaying a time limit information image representing information relating to the service validity time limit (time limit information) and a facility image area displaying a facility image representing a status of the service providing facility (such as a restaurant), in which the image to be generated is a notification image notifying a status of the service to the external terminal device 100. In the present embodiment, the time point when the object detecting unit 15 detected the service object for the first time refers to a time point when the service object was detected for the first time in a status where no service validity time limit linked to the detected service object had been set, i.e., a time point when the service starts. For example, after detecting any of the service objects for the first time, the object detecting unit 15 acquires the service content and the validity period length of the service linked to the detected service object from the service object registration table of the object registering unit 13. For example, when the detected service object is the service object 131, the bar code reading software feeds back "No. 1" as the character information, whereby the object detecting unit 15 refers to the service object registration table, acquires "reservation" as the service content and "5 minutes" as the validity period length of the service, and then outputs them as the detection information.

Upon input of the detection information from the object detecting unit 15, the time limit setting unit 16 sets a time limit on the basis of the validity period length of the service. Additionally, the image generating unit 17 generates a time limit information image on the basis of the time limit set by the time limit setting unit 16. The time limit information image will be described later. Furthermore, the image generating unit 17 outputs a notification image including the time limit information image and a facility image to a notification image transmitting unit 19. The facility image and the notification image will be described later. In the present example, the generation of a notification image by the image generating unit 17 refers to the generation of a time limit information image which is a part of the notification image.

The service status management system 1 includes the notification image transmitting unit 19 configured to transmit the notification image generated by the image generating unit 17 to the external terminal device 100. The terminal device 100 includes a display unit 101 capable of displaying an image and the like. A user (prospective visitor or potential visitor) of the terminal device 100 can confirm a service status in the service providing facility by viewing the notification image transmitted via the Internet on the display unit 101. Upon input of a notification image from the image generating unit 17, the notification image transmitting unit 19 may automatically transmit the notification image to the terminal device 100 or may transmit the notification image in response to a request from the terminal device 100 side. As a transmission destination in the case of automatically transmitting the notification image, the notification image is stored, for example, in the storage area on the processing computer in which the processing unit 10 (see FIG. 1) is deployed, for example, by pre-registration processing by the user of the terminal device 100 or by automatic registration processing performed at the time of installation of display software in the terminal device 100. Note that when the terminal device 100 is a digital signage type display, it is directly connected to the service status management system 1 by a local area network, a cable, or the like, not via the Internet, so that the transmission destination is obvious.

Additionally, when the computer in which the processing unit 10 is deployed is a microcomputer incorporated in a camera, the service provider (employer or storekeeper) of the service providing facility can view the captured image and the notification image by connecting a display to the camera.

Alternatively, when the processing computer in which the processing unit 10 is deployed is a personal computer installed in the service providing facility, the captured image and the notification image can be viewed by the display of the personal computer. Alternatively, when the processing computer in which the processing unit 10 is deployed is a server computer located outside the service providing facility, the service provider (employee or storekeeper) of the service providing facility may view the captured image and the notification image via a terminal device (such as a smartphone, a tablet type terminal device, a personal computer, or a digital signage) connectable to the server computer.

Additionally, the service status management system 1 according to the present invention may be provided to the service providing facility in the form of combination of the processing unit 10, the capturing unit 11, and the object registering unit 13. Alternatively, only an application program including a software program that executes each operation of the processing unit 10 may be provided to the service providing facility, where the service provider (employee or storekeeper) of the service providing facility may deploy the application program in a predetermined personal computer or the like, and connect the personal computer to a commercially available camera or a storage device such as a memory.

(Notification Image)

Now, the notification image to be generated by the image generating unit 17 will be described using FIG. 3. FIG. 3 is a diagram illustrating one example of a notification image 200 generated by the image generating unit 17.

As illustrated in FIG. 3, the notification image 200 is an image including a facility image area 210 displaying a facility image 201 and a time limit area 203. In the present example, the facility image 201 is a current image (still image) of the inside of the facility captured by the capturing unit 11. In the facility image 201 illustrated in FIG. 3, the panel (service object) with the two-dimensional bar code printed thereon is arranged on a table appearing in an area slightly below the center part of the image.

Additionally, the time limit area 203 is an area capable of displaying time limit information relating to the validity period of the service provided by the service providing facility. The time limit area 203 may be provided in an area different from the facility image area 210 or may be superimposed on the facility image area 210 as in the present example. In the example illustrated in FIG. 3, the time limit area 203 displays a time limit information image 231 that is a character string image representing a service content and a remaining time to the service validity time limit. The time limit information image 231 is an image displayed in the time limit area 203, and, in the present example, is an image in which a character string image "reservation" indicating the service content and a character string image ("300 seconds left") indicating the remaining time are separated by a symbol (colon), where pixels except for the characters are set to be transparent. For example, when the time limit information image 231 is a PNG format file, transparency can be set. For example, when the user of the terminal device 100 contacts the service providing facility to make a reservation for a table, the service object (for example, the service objects 131, 133) linked to reservation service in the service providing facility is arranged at a predetermined table (for example, a table at a place desired by the user or a table with the number of seats desired by the user) by, for example, the service provider, and the service status management system 1 transmits the notification image 200 including the facility image 201 with the service object as indicated in FIG. 3 and the time limit information image 231 to the terminal device 100. As a result, a facility status showing which table is reserved and a service status showing that the remaining time of the reservation service is 300 seconds are notified to the user (potential visitor or prospective visitor) of the terminal device through the notification image 200 displayed on the display unit 101 of the terminal device 100.

In the present example, while the time limit area 203 is provided in an area (lower right area) near the area where the service object is shown in the facility image area 210, the position of the time limit area 203 is not limited thereto. The time limit area 203 may be provided at a position not hindering visual recognition of the service object in the facility image area 210 or may be provided outside the facility image area 210 (for example, an area outside the facility image area 210 that is any of upper, lower, right, and left areas adjacent to the facility image area 210, or the like). Alternatively, the display unit 101 may be formed by a touch panel display, and the time limit area 203 may be provided near the area with the image of the service object only after the user touches the area with the image of the service object. In addition, in the time limit information image 231 illustrated in FIG. 3, the remaining time of the validity period of the service is displayed on a second unit basis. However, the display mode of the time limit information image 231 is not limited thereto. In the time limit information image 231, the remaining time may be displayed up to milliseconds, or minutes, seconds, and milliseconds may be displayed by colon separation (minutes:seconds:milliseconds). In addition, instead of the display of a remaining time, there may be displayed a date and a time (month, day, and time point or time point, without date) when the service validity time limit expires. There may be displayed both the remaining time and the date and time point when the service validity time limit expires. In addition, when the design of the service object is known to the user, the character string image indicating the service content "reservation:" is unnecessary.

(Service Status Notification Processing)

Figure 4:
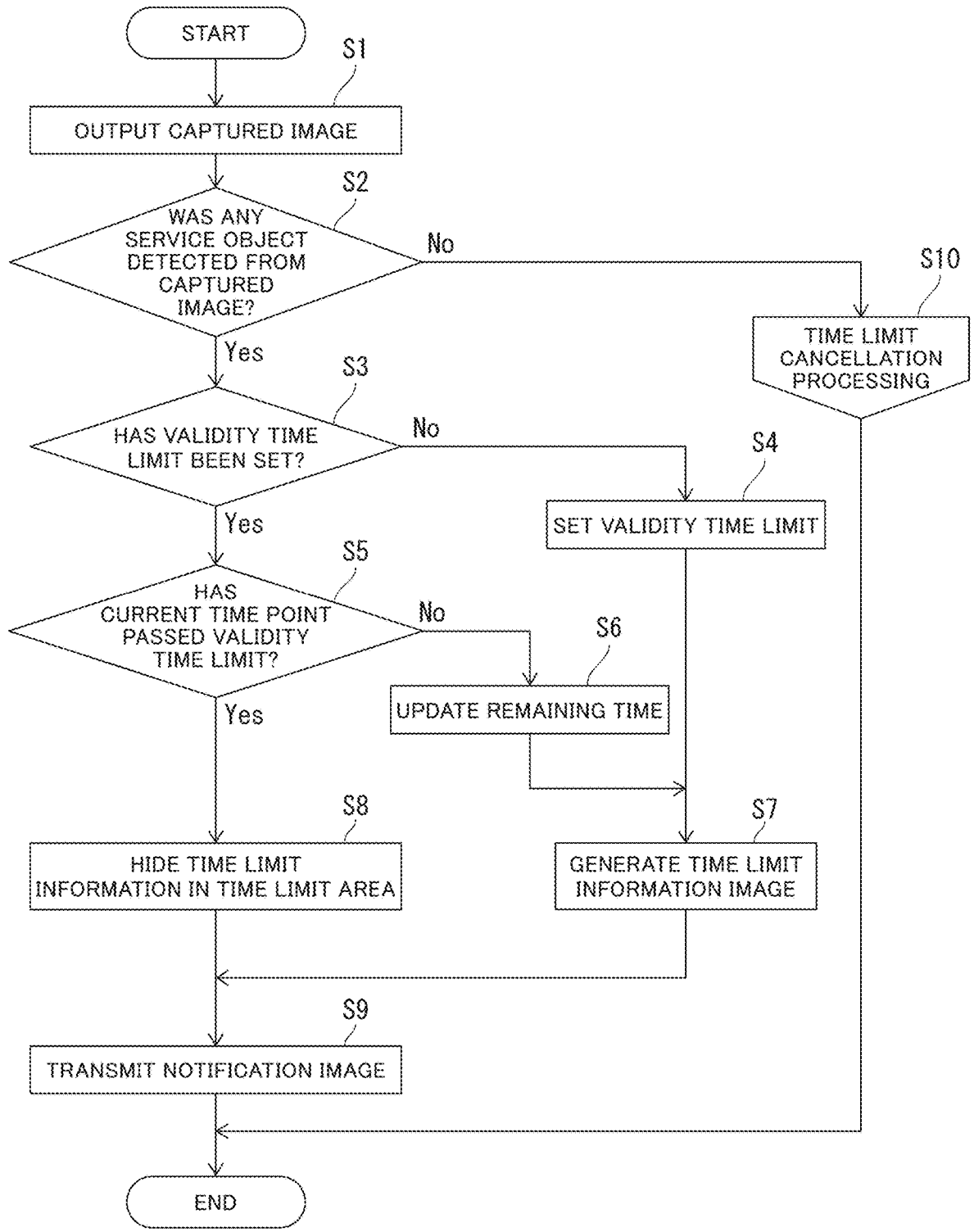
FIG. 4 is a flowchart illustrating one example of a flow of service status notification processing in the service status management system according to the first embodiment of the present invention.

Next, using FIG. 4, a description will be given of a flow of service status notification processing, which is the processing where the service status management system 1 according to the present embodiment transmits the notification image 200 to the terminal device 100. FIG. 4 is a flowchart illustrating one example of the flow of the service status notification processing. The service status management system 1 according to the present embodiment executes the service status notification processing, for example, 30 times per second. Alternatively, the service status notification processing is executed, for example, 4 times per second by reducing the frequency of execution to prevent a third party from identifying an individual from the walking manner of a person appearing in the camera image.

(Step S1)

At step S1, the capturing unit 11 captures the inside of the service providing facility, and outputs a single captured image to the object detecting unit 15 and the image generating unit 17. Upon input of the captured image, the object detecting unit 15 executes processing of step S2.

(Step S2)

At step S2, the object detecting unit 15 searches for whether or not the captured image captured at step S1 includes any of the two-dimensional bar codes (any of the service objects 131, 133, and 135 illustrated in FIG. 2) previously registered in the object registering unit 13, by using a bar code reading software (for example, "ZBAR"). Specifically, when the bar code reading software detects any of the two-dimensional bar codes and then feeds back the character information, the object detecting unit 15 refers to the service object registration table (see FIG. 2) and acquires, as service information, a " " and a "valid period length" via the "character information". When the character information fed back by the bar code reading software is corresponding to any piece of the character information in the column of "character information" of the service object registration table, the object detecting unit 15 determines that the previously registered service object has been detected from the captured image. When it is determined that any of the service objects 131, 133, and 135 has been detected, the object detecting unit 15 outputs service information (the service content and the validity period length) read from the service object and a time point when the service object was detected (detection time point) as detection information to the time limit setting unit 16. Upon input of the detection information, the time limit setting unit 16 executes processing of step S3.

On the other hand, when the object detecting unit 15 determines that the previously registered service object has not been detected from the captured image, the object detecting unit 15 outputs information indicating that none of the service objects 131, 133, and 135 has been detected (nondetection information) to the time limit setting unit 16. Assumed examples of a case where any of the service objects is not detected from the captured image include a case where none of the service objects 131, 133, and 135 is not arranged in the facility (the two-dimensional bar codes are not included in the captured image), a case where character information included in the two-dimensional bar code included in the captured image is not corresponding to any of the contents set in the column of "CHARACTER INFORMATION" of the service object registration table, and a case where the service object arranged in the facility is shielded by a shielding object (an other object or a person). Upon input of the information indicating that none of the service objects has been detected (nondetection information), the time limit setting unit 16 executes time limit cancellation processing of step S10. The time limit cancellation processing will be described later.

(Step S3)

At step S3, the time limit setting unit 16 determines whether or not the service validity time limit has been set. Whether or not the service validity time limit has been set is determined by whether or not a validity time limit time point has been stored in the predetermined storage area on the computer in which the processing unit 10 (see FIG. 1) is deployed. The validity time limit time point is a time point indicating the service validity time limit, which is a time point obtained by adding the validity period length (see FIG. 2) linked to the service object to a time point when the object detecting unit 15 detected the service object for the first time (detection time point) as a starting point. The fact that the validity time limit time point has been set indicates that the service linked to the service object detected at step S2 has been started, and the time limit information image 231 to be displayed in the time limit area 203 (see FIG. 3) has been generated. When the time limit setting unit 16 determines that since the validity time limit time point has been stored in the predetermined storage area, the service validity time limit has been set, the time limit setting unit 16 proceeds to processing of step S5. On the other hand, when the time limit setting unit 16 determines that since the validity time limit time point has not been stored in the predetermined storage area, the service validity time limit has not been set, i.e., the service object has been detected for the first time, the time limit setting unit 16 proceeds to processing of step S4.

(Step S4)

At step S4, the time limit setting unit 16 sets the service validity time limit at the time of start of the service, and then proceeds to processing of step S7. Specifically, the time limit setting unit 16 acquires the validity period length of the service included in the detection information output by the object detecting unit 15. Furthermore, the time limit setting unit 16 stores, as the validity time limit time point, a time point obtained by adding the validity period length of the service to the detection time point included in the detection information input from the object detecting unit 15, in the predetermined storage area. For example, when the validity period length included in the detection information is "5 minutes" and the detection time point is 10 minutes past 10 o'clock, the validity time limit time point is 15 minutes past 10 o'clock (=10 minutes past 10 o'clock+5 minutes). When the remaining time of the validity period of the service is displayed as time limit information in the time limit information image 231, the time limit setting unit 16 directly stores the acquired validity period length as time limit information in the predetermined storage area. The time limit information is an information relating to the service validity time limit, and is used for generation of the time limit information image 231 in processing of step S7 to be described later. The time limit setting unit 16 sets, as a remaining time, for example, a value obtained by converting the unit of validity period length from "minutes" to "seconds", to the time limit information. For example, the validity period length of "5 minutes" is set, as "300 seconds" to the time limit information. The remaining time set to the time limit information at step S4 is updated at step S6 to be described later, every time the service object is detected during a time period until the validity time limit time point passes. Note that in a case where the time limit information is displayed by a date and a time when the service validity time limit expires in the time limit information image 231 (see FIG. 3), the validity time limit time point is set as the time limit information at the present step 4. In this case, updating processing of the remaining time at step S6 is omitted.

(Step S5)

At step S5, the time limit setting unit 16 acquires a current time point, and then determines whether or not the current time point has passed the validity time limit time point set at step S4. The present example uses, as the current time point, a current time point on the computer in which the processing unit 10 (see FIG. 1) is deployed. When the time limit setting unit 16 determines that the current time point has passed the validity time limit time point, the time limit setting unit 16 proceeds to processing of step S8. On the other hand, when the time limit setting unit 16 determines that the current time point has not passed the validity time limit time point and the validity period of the service continues, the time limit setting unit 16 proceeds to processing of step S6.

(Step S6)

At step S6, the time limit setting unit 16 updates the remaining time stored as the time limit information in the predetermined storage area, and then outputs the detection information including the service content which is a part of the service information input from the object detecting unit 15 to the image generating unit 17. Upon input of the detection information from the time limit setting unit 16, the image generating unit 17 executes processing of step S7. Specifically, the time limit setting unit 16 updates to a value obtained by subtracting the current time point from the validity time limit time point. As long as an execution interval of the service status notification processing can be accurately repeated, the remaining time may be updated by subtracting the execution interval (for example, 0.25 seconds when the interval is 4 times per second) from the current remaining time. Note that in the case where the time limit information is displayed by the date and the time when the service validity time limit expires in the time limit information image 231, the updating processing of step S6 is omitted, and the processing proceeds from "No" at step S5 to processing of step S7.

(Step S7)

At step S7, the image generating unit 17 generates the time limit information image 231 to be displayed in the time limit area 203, and proceeds to processing of step S9. Specifically, the image generating unit 17 generates the time limit information image 231 using the service content included in the detection information input from the object detecting unit 15 via the time limit setting unit 16 and the time limit information stored in the predetermined storage area by the time limit setting unit 16. At step S7 to which the processing has proceeded from step S4, for example, when the service content included in the detection information is "reservation" and the remaining time set to the time limit information is 300 seconds, the image generating unit 17 generates a character string image in which "reservation" and "300 seconds remaining" are separated by a colon. In this manner, the time limit information image 231 is generated that represents information relating to the service validity time limit, as illustrated in FIG. 3. In addition, at step S7 to which the processing has proceeded from step S6, for example, when the remaining time includes digits after the decimal point, like "299.75 seconds", the digits after the decimal point may be rounded off, and the remaining time may be displayed as "299 seconds". The remaining time set to the time limit information is the value indicating the validity period length initialized at step S4 when the service object was detected for the first time, which is the value to be updated at step S6. Every time the processing of step S6 is executed, the remaining time of the time limit information is reduced. Thus, in the time limit information image 231, the remaining time of the validity period of the service is count-down displayed.

Note that when the time limit information in the time limit information image 231 is displayed by the date and the time when the service validity time limit expires (validity time limit time point), the time limit information image 231 can be repeatedly used by generating the time limit information image 231 only once when the service object is detected for the first time. In this manner, when the object detecting unit 15 detects the service object (Yes at step S2) and the time limit setting unit 16 determines that the service validity time limit has not expired (No at step S5), the image generating unit 17 generates the time limit information image 231 displaying the time limit information, and displays it in the time limit area 203 of the notification image 200. In the present example, the generation of the notification image 200 by the image generating unit 17 refers to the generation of the time limit information image 231.

(Step S8)

At step S8, the image generating unit 17 deletes the time limit information of the time limit information image 231 displayed in the time limit area 203 (see FIG. 3), and proceeds to processing of step S9. The deletion of the time limit information refers to, for example, making the entire part of the time limit information image 231 transparent when the time limit area 203 overlaps on the facility image area 210, and refers to initializing the time limit information image 231 (for example, colored in monochromatically) when the time limit area 203 does not overlap on the facility image area 210. By doing this, the time limit information (the remaining time of the validity period or the validity time limit time point in the present example) is hidden in the time limit area 203.

Figure 5:
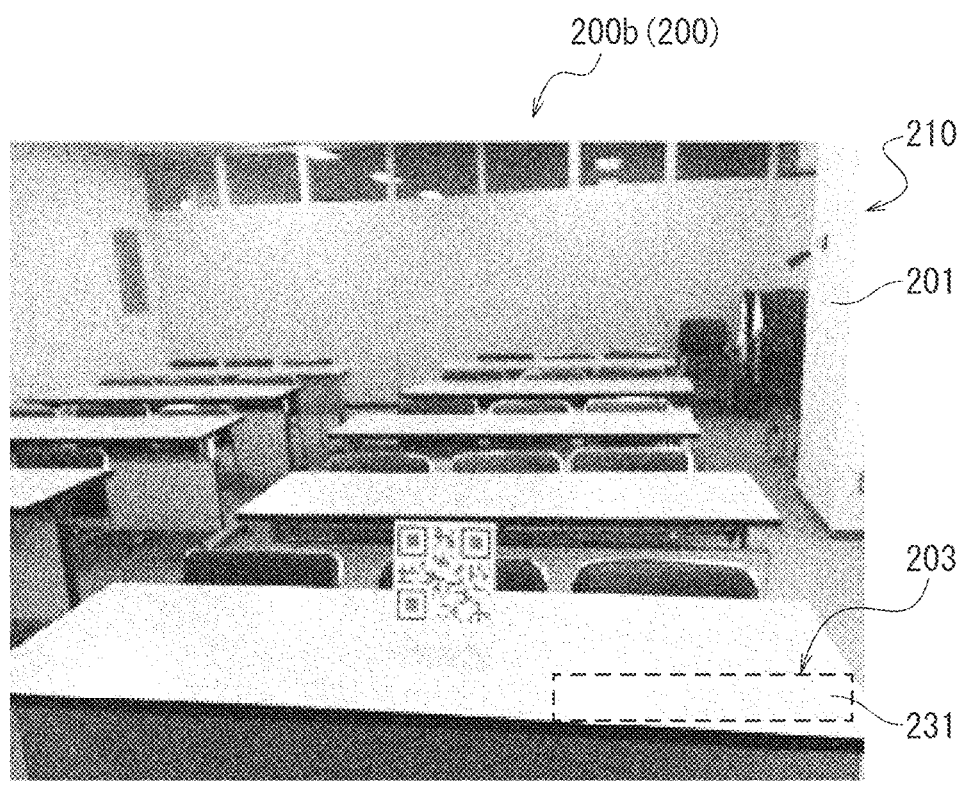
FIG. 5 is a diagram illustrating one example of the notification image.

FIG. 5 is a diagram illustrating one example of the notification image including the time limit information image 231 in which the time limit information has been hidden at step S8. As illustrated in FIG. 5, the service object is displayed in the facility image area 210, similarly to that illustrated in FIG. 3. In this case, the image generating unit 17 may display, for example, a character string image "reservation service ended" as the time limit information image 231. This can prevent the user of the terminal device 100 who has viewed a notification image 200b with the hidden time limit information from having a misunderstanding that a table with the service object arranged thereat is reserved.

(Step S9)

Returning to FIG. 4, at step S9, the notification image transmitting unit 19 transmits the notification image 200 to the terminal device 100 via the Internet. The notification image 200 is an image including the facility image area 210 displaying the facility image 201 and the time limit area 203 capable of displaying the time limit information image 231. Thus, the user of the terminal device 100 can view the notification image 200 through the display unit 101, and thereby can grasp the status of a service (such as reservation or discount) provided by the service providing facility and which table is a reserved one when the service is reservation of a table. Note that, in the present example, the facility image 201 displayed in the facility image area 210 is the image itself of the inside of the facility, which is the captured image captured by the capturing unit 11 at step S1.

As described hereinabove, the service status management system 1 according to the present embodiment executes the service status notification processing, for example, 4 times per second (every 0.25 seconds). As a result, the notification image is transmitted every 0.25 seconds to a terminal device (for example, the terminal device 100) used by a potential visitor to notify the status of the inside of the service providing facility and the status (for example, the remaining time of the reservation service and notification of the reserved table) of the service (reservation or discount) provided by the service providing facility. This allows a potential visitor to confirm the status of the service and the like in substantially real time. Additionally, when the time limit information displayed in the time limit information image 231 indicates the remaining time of the validity period, a numerical value indicating the remaining time is counted down every unit time. By doing this, the service status management system 1 can promote prospective visitors' (for example, the reservation person) visit to the service providing facility within the service validity period. In addition, when the service provided by the service provider is a reservation service, the service status management system 1 allows potential visitors to also view a period (the remaining time of the validity period) which a reservation person currently using a reservation service can keep the reservation service. This can improve the possibility of acquiring potential visitors who determine, if there is little remaining time, that the reservation person is very unlikely to show up, and become willing to newly use the reservation service.

In addition, although unillustrated, when the service provided by the service providing facility is a discount service, a discount rate previously determined by the service provider may be displayed on the notification image. The discount rate is displayed together with the service content and a remaining time, for example, like "now 10% discount: 300 seconds remaining" in the time limit information image 231.

Additionally, in the service status notification processing (Yes at step S5), when the service validity period expires, the service status management system 1 deletes the time limit information of the time limit information image 231 and displays, for example, "reservation service ended" in the time limit information image 231 (step S8). Thus, in the service providing facility using the service status management system 1, the service provider (employee or storekeeper) does not have to do work for managing the validity period of the service, such as grasping, for example, expiration of the service validity time limit and removing the service object after expiration of the service validity time limit, so that the service provider can concentrate on his or her primary job. For example, in a method in which a tag indicating "reserved" is placed on a table, an image including the table is captured by a camera, and then the image captured by the camera is viewed from outside, there has been a problem where if a prospective visitor who has made reservation does not show up and the service provider leaves the tag as it is, it is impossible to acquire any potential visitor viewing the image. By contrast, the service status management system 1 can display, in the notification image, the fact that the validity period of the previous reservation service has ended, and can notify it to potential visitors, so that it is possible to notify the potential visitors that a request for a new reservation service is acceptable. Thus, the service status management system 1 can promote use of the reservation service, and can increase opportunities for the service providing facility to newly acquire prospective visitors who will use a reservation service. In this way, the service status management system 1 can improve accuracy in service status notification to potential visitors and service status management on the facility side, without increasing work load on the facility side.

In addition, the service status management system 1 may include a reservation receiving unit configured to receive a request for use of a reservation service, for example, from the terminal device 100. Upon transmission of the request for use of the reservation service from the terminal device 100, the reservation receiving unit sends a notification that there has been the request for use of the reservation service to, for example, a terminal device carried by the service provider. The service provider confirms the notification and then arranges the service object (the service objects 131, 133) linked to the reservation service at a predetermined table. As a result, the validity period of the reservation service is started.

(Service Object Detection Method)

Now, a description will be given of one example of a detection method for detecting the service object from the captured image by the object detecting unit 15 (step S2) in the service status management system 1 according to the present embodiment.

When the object detecting unit 15 detects the service object in the captured image captured by the capturing unit 11, a maximum size of the image to be searched for (the image of the service object) is determined by assuming that the service object appears in the entire angular field of view, and a minimum size of the image to be searched for is determined depending on a maximum distance between an assumed camera (the capturing unit 11) and the service object and image resolution. However, searching the entire angular field of view at all search sizes from maximum to minimum sizes every time capturing is performed may slow down the speed of detection processing or may cause erroneous detection.

Thus, for example, when newly installing the service status management system 1 or after changing the layout of tables, sofa, and the like in the service providing facility, a service object is arranged on every equipment one by one in the service providing facility, and initialization processing is performed only once in which search is performed at all search sizes from maximum to minimum sizes in all areas. This allows determination of areas (such as the ceiling, walls, and passages) for which the object detecting unit 15 does not have to search within the angular field of view. On the other hand, an object that appears in the captured image captured by the capturing unit 11 becomes larger in size as being closer to the capturing unit 11, and becomes smaller in size as being more distant therefrom. Thus, by dividing the area to be searched for when the object detecting unit 15 detects the service object, an approximate search size of the detection target is determined for each of the divided areas. By performing such search size determination processing, it is unnecessary to search for the service object at all search sizes in all areas of the angular field of view of the captured image. This search size determination processing can increase the speed of the subsequent searching for the service object to shorten the search time and can improve accuracy in the service object detection by the object detecting unit 15.

(Time Limit Cancellation Processing)

Figure 6:
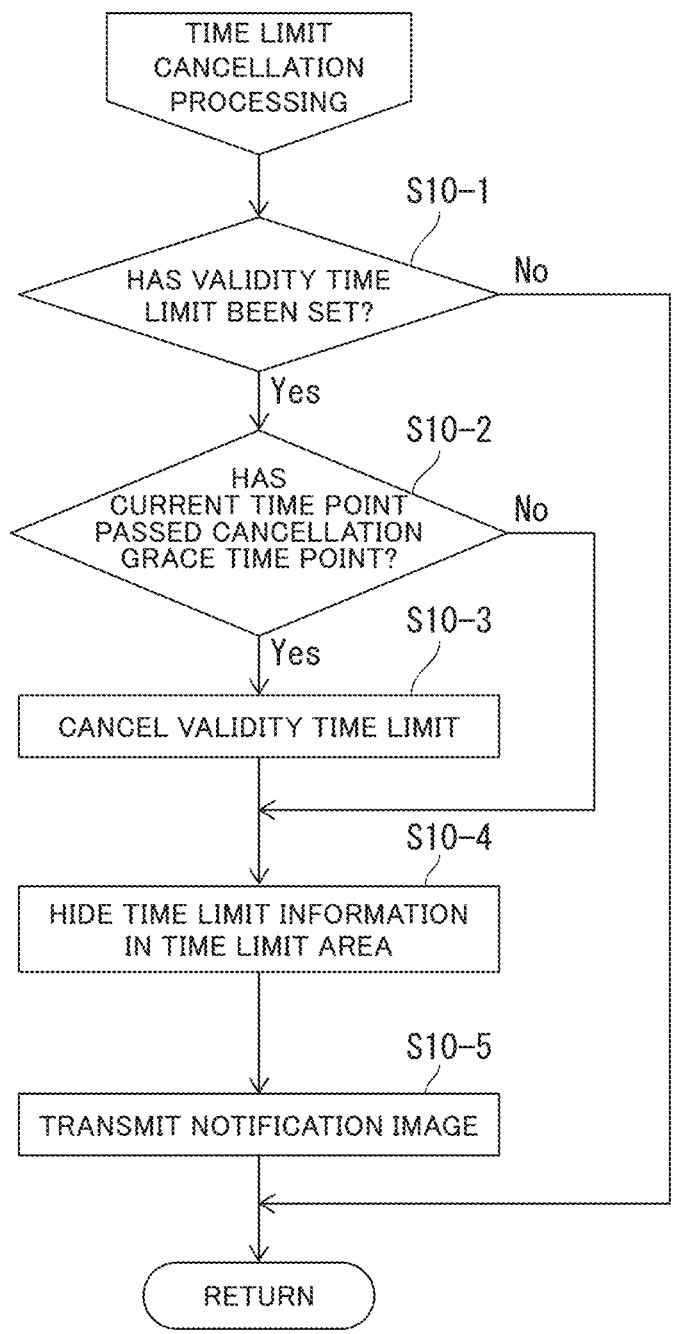
FIG. 6 is a flowchart illustrating one example of a flow of time limit cancellation processing in the service status management system according to the first embodiment of the present invention.

Next, the time limit cancellation processing executed at step S10 of the service status notification processing (see FIG. 4) by the service status management system 1 according to the present embodiment will be described using FIG. 6. FIG. 6 is a flowchart illustrating one example of a flow of the time limit cancellation processing. The time limit setting unit 16 executes the time limit cancellation processing on the basis of an information indicating nondetection of the service object (nondetection information) input from the object detecting unit 15 into the time limit setting unit 16 (No at step S2).

(Step S10-1)

At step S10-1, the time limit setting unit 16 determines whether or not the service validity time limit has been set. Whether or not the service validity time limit has been set is determined by whether or not the validity time limit time point of the service has been stored in the predetermined storage area, similarly to the processing of step S3 (see FIG. 4). When the time limit setting unit 16 determines that since the validity time limit time point has been stored in the predetermined storage area, the service validity time limit has been set, the time limit setting unit 16 proceeds to processing of step S10-2. On the other hand, when the time limit setting unit 16 determines that since the validity time limit time point has not been stored in the predetermined storage area, the service validity time limit has not been set, the time limit setting unit 16 ends time limit cancellation processing without executing pieces of processing at step S10-2 and thereafter, and returns to the service status notification processing.
(Step S10-2)

At step S10-2, the time limit setting unit 16 determines whether or not the current time point has passed a cancellation grace time point. As the current time point, a current time point on the processing computer is used, similarly to step S5. Additionally, in the present example, "cancellation grace time point" refers to a time point obtained by adding a cancellation grace time to a time point when the service object was detected for the last time. The cancelation grace time will now be described.
(Cancellation Grace Time)

There are many people and objects in the service providing facility. Thus, due to the presence of a shielding object between the capturing unit 11 (camera) and the service object or other reason, the service object may not appear in the captured image, so that the object detecting unit 15 may not be able to detect the service object even within the validity period of the service. In such a case, if it is considered that the service provider (employee or storekeeper) has removed the service object in order to forcibly end the validity period of the service and then the validity time limit is cancelled, the service validity time limit is reset when the shielding object disappears and the service object is detected again, so that the service validity time limit will be postponed unintentionally. To prevent such a situation, the service status management system 1 according to the present embodiment provides a cancellation grace time. The service status management system 1 does not immediately cancel the time limit even if the service object is not detected by the object detecting unit 15. Then, when a cancelation grace time point (a time point when the service object was detected for the last time+a cancelation grace time) passes, the service status management system 1 cancels the service validity time limit (processing of step S10-3 to be described later). As a result, the service status management system 1 can prevent postponement of the service validity time limit that is not intended by the service providing facility.

In the present example, the cancellation grace time is a preset time interval (for example, 3 minutes). For example, when assuming that a time point where the service object was detected last time by the object detecting unit 15 is 10 minutes past 10 o'clock, the cancellation grace time point is 13 minutes past 10 o'clock (=10 minutes past 10 o'clock+3 minutes). Note that the time point where the service object was detected last time may be stored in the predetermined storage area in the processing of, for example, step S9 (see FIG. 4) on the basis of the detection information output by the object detecting unit 15, for example, at step S2 (see FIG. 4). This function is effective even in a case where the service object is allowed to stand despite the validity period of the service has expired. When the time limit setting unit 16 determines that the cancellation grace time point has been passed, it proceeds to processing of step S10-3. On the other hand, when the time limit setting unit 16 determines that the cancellation grace time point has not been passed, it proceeds to processing of step S10-4.
(Step S10-3)

At step S10-3, the time limit setting unit 16 cancels the validity period of the service, and proceeds to the processing of step S10-4. Cancelling the validity period of the service specifically means resetting the value of a validity time limit time point of the service and the value of the time limit information of the service stored in the predetermined storage area. Thus, when the service object is detected again (Yes at step S2) by the object detecting unit 15 in the service status notification processing (see FIG. 4), it is determined that the service validity time limit has not been set by the time limit setting unit 16, i.e., the service object has been detected for the first time (No. at step S3), and the service validity time limit is set again (step S4).
(Step S10-4)

At step S10-4, the image generating unit 17 deletes the time limit information (the remaining time of the validity period in the present example) in the time limit area 203 (see FIG. 3), and proceeds to processing of step S10-5. Deleting the time limit information means making transparent the entire part of the time limit information image 231, for example, when the time limit area 203 overlaps with the facility image area 210, whereas when the time limit area 203 does not overlap with the facility image area 210, it means initializing the entire part of the time limit information image 231 (for example, colored in monochromatically), similarly to step S8. By doing this, the time limit information (such as the remaining time of the validity period, in the present example) is hidden in the time limit area 203. The facility image 201 in the notification image including the time limit information image 231 generated at step S10-4 is different from the facility images 201 illustrated in FIG. 3 and FIG. 5 in that, for example, the service object is covered by a shielding object (including a person and an object) and cannot be captured by the capturing unit 11 (camera). Alternatively, due to removal of the service object from an area inside the service providing facility to be captured by the capturing unit 11, the service object may not be able to be captured by the capturing unit 11 (camera).

Figure 7:
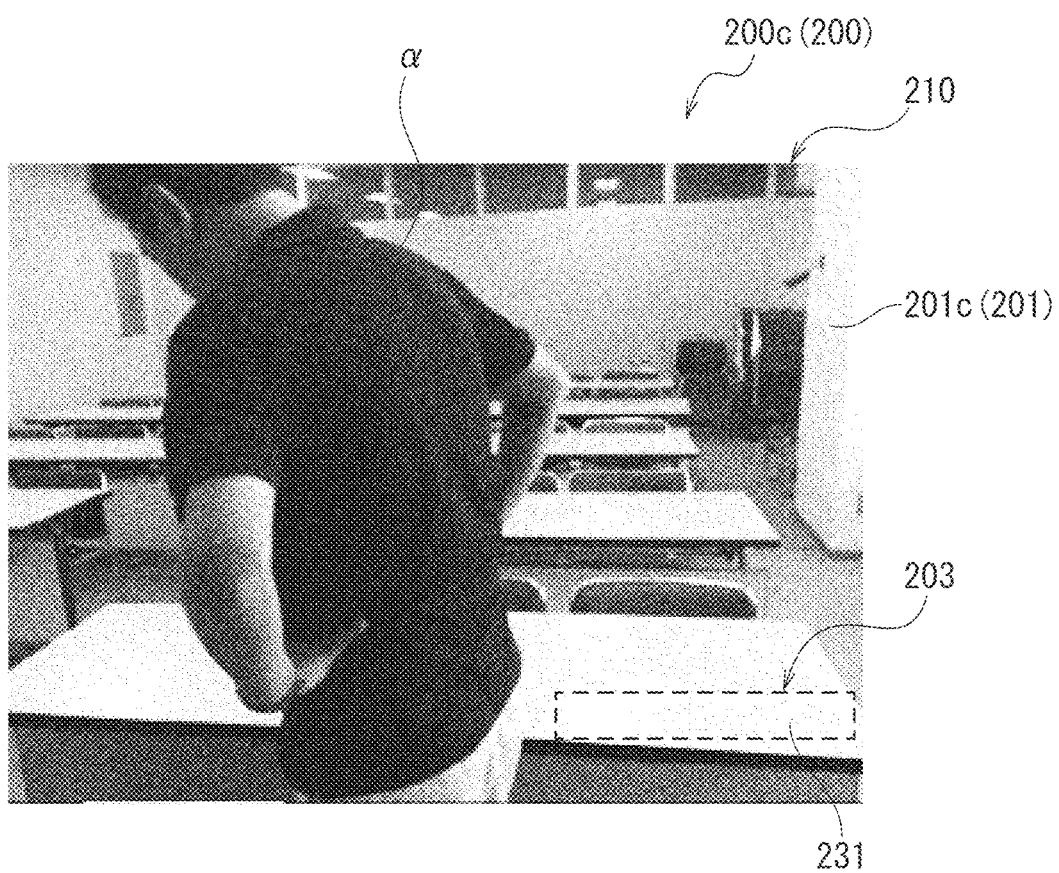
FIG. 7 is a diagram illustrating one example of the notification image displaying a time limit information image in a case where any service object has not been detected even though within a service validity period.

FIG. 7 is a diagram illustrating one example of a notification image 200c displaying the time limit information image 231 generated at step S10-4. As illustrated in FIG. 7, in a facility image 201c, the service object is shielded by a person α. Additionally, in the time limit area 203, the time limit information image 231 is made transparent to be hidden.
(Step S10-5)

Returning to FIG. 6, at step S10-5, the notification image transmitting unit 19 transmits the notification image 200 to the terminal device 100 of a potential visitor via the Internet. The notification image 200 is an image that includes the facility image area 210 displaying the facility image 201 and the time limit area 203 allowing display of the time limit information image 231.

Thus, in the service status management system 1, even when the service object is not detected by the object detecting unit 15 at step S2 of the service status notification processing (see FIG. 4), cancellation of the service validity time limit can be executed by executing the time limit cancellation processing (particularly, the pieces of processing of from step S10-1 to step S10-3). Additionally, in the service status management system 1, the fact that the cancellation grace time point has passed (Yes at step S10-2) is set as the condition for canceling the service validity time limit in the time limit cancellation processing. This can prevent postponement of the service validity time limit that is not intended by the service providing facility.

Specifically, as described using FIGS. 3, 5, and 7, the image generating unit 17 in the service status management system 1 according to the present embodiment automatically generates a different time limit information image 231 depending on whether or not the service validity time limit has passed and whether or not the service object has been detected by the object detecting unit 15. As a result, in the service status management system 1, the service status can be accurately notified to potential visitors even though the service provider (employee or storekeeper) does not perform complicated processing. In this way, the service status management system 1 can improve accuracy in notification of the service status to potential visitors and management of the service status on the facility side, without increasing work load on the facility side.

Second Embodiment

Next, a description will be given of a service status management system according to a second embodiment of the present invention. The service status management system according to the present embodiment has the same structure and the same functional effects as those of the service status management system 1 according to the first embodiment, except that service status notification processing (see FIG. 4) for transmitting a notification image to an external terminal device (for example, the terminal device 100) is different from that of the first embodiment. Thus, hereinafter, the service status management system according to the present embodiment and components of the service status management system will be described using the same reference signs as those of the service status management system 1 illustrated in FIG. 1.

Now, one example of the service status notification processing according to the present embodiment will be described using FIG. 8.

Figure 8:
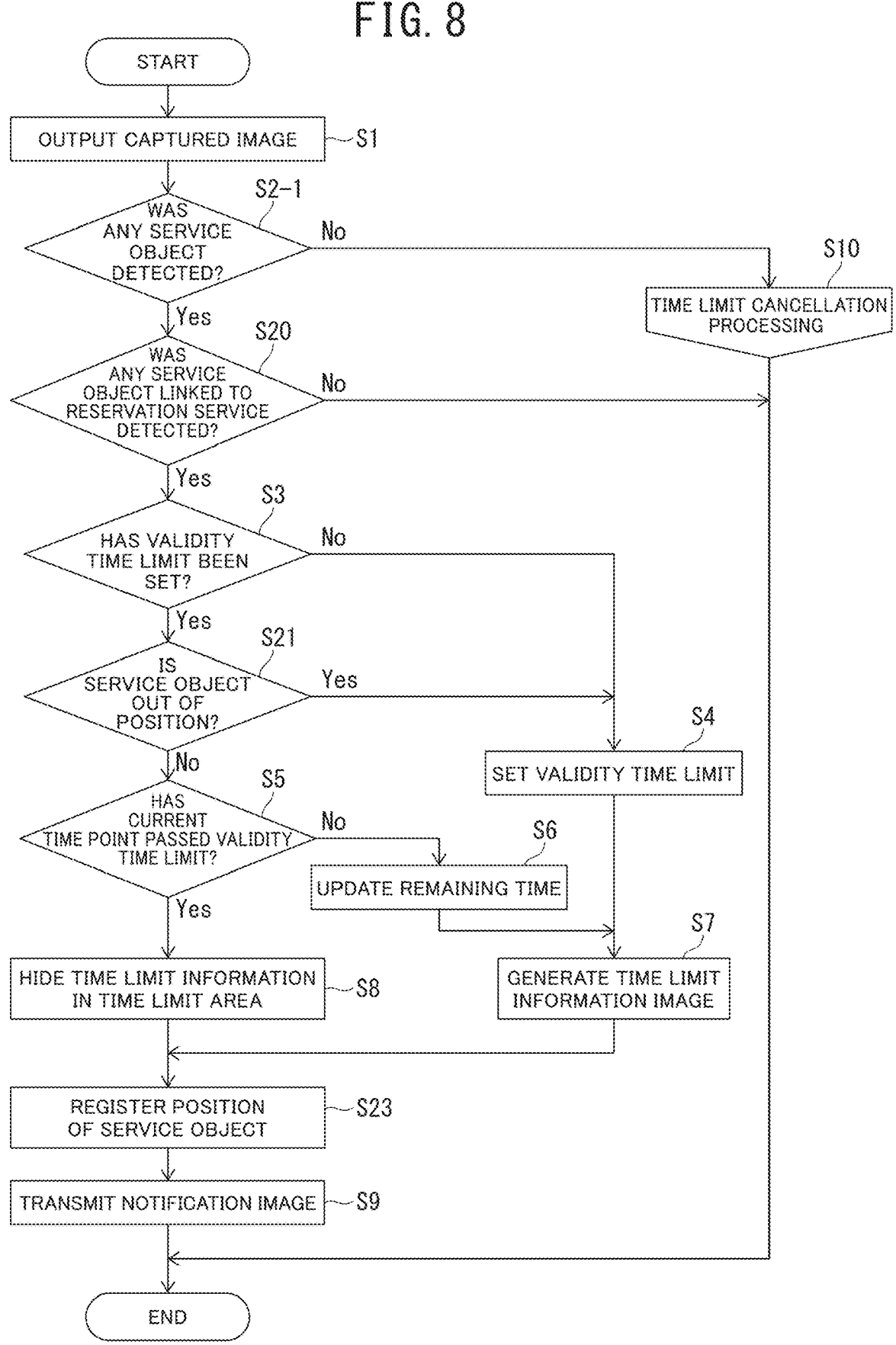
FIG. 8 is a flowchart describing one example of a flow of service status notification processing in a service status management system according to a second embodiment of the present invention.

FIG. 8 is a flowchart for describing one example of a flow of the service status notification processing in the present embodiment. In FIG. 8, steps for performing the same processing as that in the first embodiment in the service status notification processing in the present embodiment are denoted by the same reference signs as those of the flowchart of the service status notification processing illustrated in FIG. 4, and descriptions thereof will be omitted.

As illustrated in FIG. 8, when the service status notification processing is started, the capturing unit 11 outputs a captured image of the inside of the facility to the object detecting unit 15 and the image generating unit 17 (step S1), and the object detecting unit 15 executes processing of step S2-1.
(Step S2-1)

At step S2-1, the object detecting unit 15 searches for whether or not any service object (any of the service objects 131, 133, and 135 illustrated in FIG. 2) is included in the captured image. When the object detecting unit 15 determines that any of the service objects is included in the captured image, it proceeds to processing of step S20. On the other hand, when the object detecting unit 15 determines that none of the service objects is included in the captured image, the object detecting unit 15 outputs information indicating that none of the service objects 131, 133, and 135 has been detected (nondetection information) to the time limit setting unit 16. Upon input of the nondetection information, the time limit setting unit 16 executes the time limit cancellation processing of step S10. The time limit cancellation processing executed in the present embodiment is the same processing as the time limit cancellation processing (see FIG. 5) executed in the above first embodiment.
(Step S20)

At step S20, when the object detecting unit 15 determines using bar code reading software (for example, "ZBAR") that the service objects 131, 133 whose service content is "reservation" have been detected, the object detecting unit 15 adds information (current position information) indicating a current position of the service object to the detection information, and outputs to the time limit setting unit 16. When the time limit setting unit 16 determines at the subsequent step S3 that the validity time limit has been set, the time limit setting unit 16 proceeds to processing of step S21. On the other hand, when the object detecting unit 15 determines that the service objects 131, 133 whose service content is "reservation" have not been detected, the object detecting unit 15 ends the service status notification processing, without executing the pieces of processing of step S3 and subsequent steps.
(Step S21)

At step S21, the time limit setting unit 16 determines whether or not the position of the service object in the captured image is deviated from position (previous position) of the service object at the time of previous service status notification processing. Information relating to the previous position is stored as previous position information in the predetermined storage area on the processing computer in which the processing unit 10 (see FIG. 1) is deployed. When the service object is not detected, the previous position information is not updated, and is maintained. Additionally, upon startup of the service status management system 1, for example, coordinates outside the area of the facility image 201 are set as the previous position information. The time limit setting unit 16 compares the position information (current position information) of the service object included in the detection information input from the object detecting unit 15 with the previous position information, and determines whether both are not coincident, i.e., whether or not there is any deviation between the position of the service object included in the current position information and the position of the service object included in the previous position information. When the time limit setting unit 16 determines that there is a deviation between the position of the service object included in the current position information and the position of the service object included in the previous position information, the time limit setting unit 16 proceeds to the processing of step S4 (the setting of a service validity time limit). As a result, on the basis of the deviation of the position of the service object, resetting of the service validity time limit is executed. On the other hand, when the time limit setting unit 16 determines that the current position information is coincident with the previous position information and there is no deviation therebetween, the time limit setting unit 16 proceeds to the processing of step S5.
(Step S23)

Subsequently after the image generating unit 17 executes the processing of step S7 or step S8, the time limit setting unit 16 executes processing of step S23.

At step S23, the time limit setting unit 16 updates the previous position information with the content of the current position information. By doing this, the current position information of the service object is stored in the predetermined storage area, and can be used to determine the presence or absence of a positional deviation of the service object in next service status notification processing. When the processing of step S23 ends, the notification image transmitting unit 19 transmits the notification image to a terminal device (for example, the terminal device 100) at step S9, and then the service status notification processing ends.

As described hereinabove, in the service status notification processing in the present embodiment, when providing a reservation service by the service providing facility, resetting of the service validity time limit is executed (step S4) due to the deviation of the position of the service object from the position thereof in the previous service status notification processing (Yes at step S21).

As a result, for example, only by moving a service object to a table (table B) adjacent to a table (table A) with the service object currently being placed thereon, the service provider (employee or storekeeper) of the service providing facility can newly start a reservation service for the table B. In addition, for example, when it is desirable to reset a service validity period for the table A before the validity period of the reservation service for the table A expires, the position of the service object may be slide a little bit on the table A. In this way, the service status management system 1 according to the present embodiment can easily execute resetting of the validity time limit of a reservation service in the service providing facility.

Additionally, in the service status management system 1 according to the present embodiment, as long as the deviation between the current position of a service object and the previous position thereof is within a predetermined error range, it may be determined at step S21 that the service object is not moved. This can prevent the service validity time limit from being postponed due to unintended resetting of the service validity time limit when the position of the service object is deviated by vibration and the like caused by movement of equipment and people in the service providing facility.

Third Embodiment

Next, a description will be given of a service status management system according to a third embodiment of the present invention. The service status management system according to the present embodiment has the same structure and the same functional effects as those of the service status management system 1 according to the first embodiment, except that service status notification processing (see FIG. 4) for transmitting a notification image to an external terminal device (for example, the terminal device 100) is different from that of the first embodiment. Thus, hereinafter, the service status management system according to the present embodiment and components of the service status management system will be described using the same reference signs as those of the service status management system 1 illustrated in FIG. 1.

Now, one example of the service status notification processing in the present embodiment will be described using FIG. 9.

Figure 9:
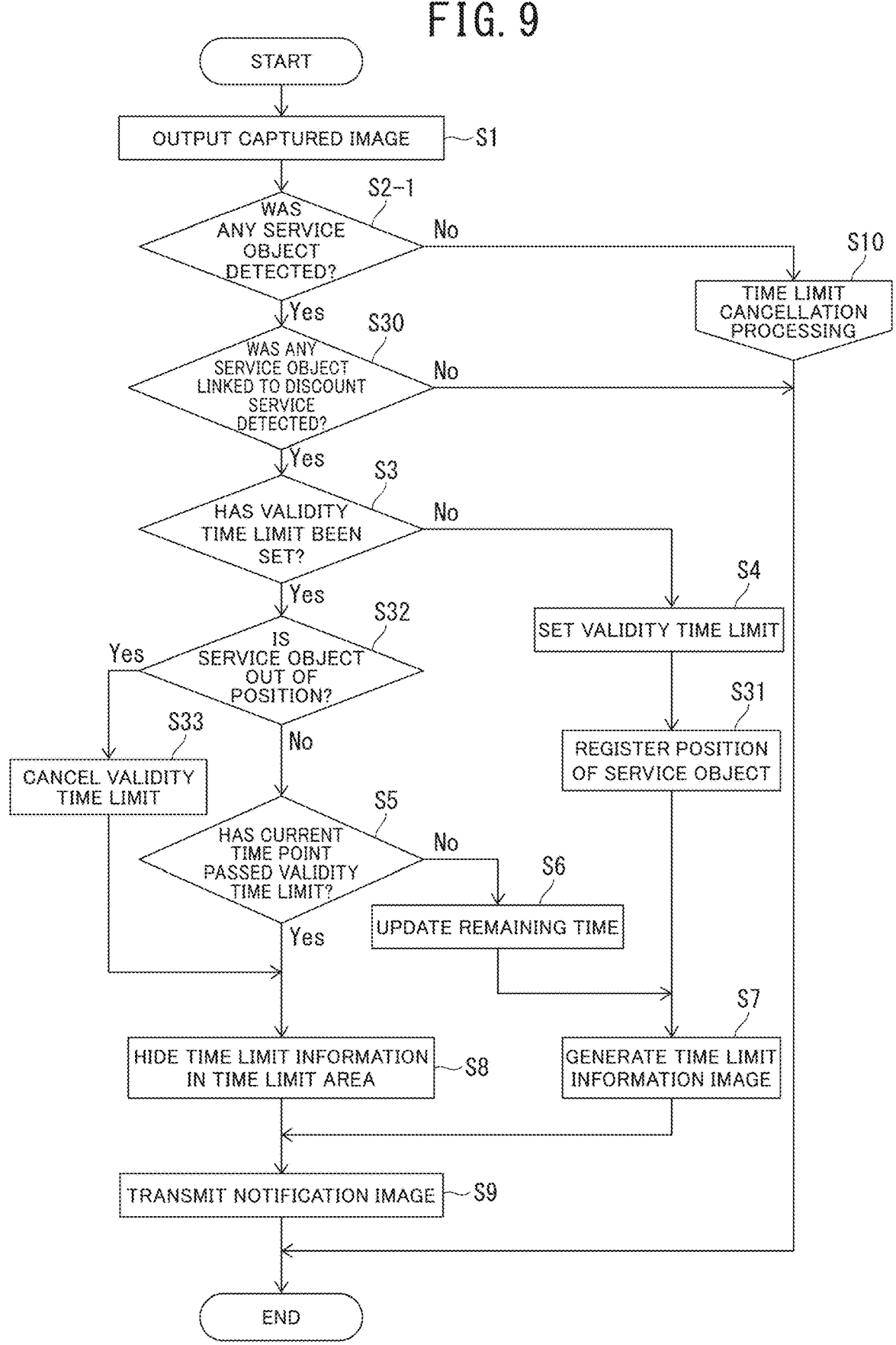
FIG. 9 is a flowchart describing one example of a flow of service status notification processing in a service status management system according to a third embodiment of the present invention.

FIG. 9 is a flowchart for describing one example of a flow of the service status notification processing in the present embodiment. In FIG. 9, steps for performing the same processing as that in the first embodiment in the service status notification processing in the present embodiment are denoted by the same reference signs as those of the flowchart of the service status notification processing illustrated in FIG. 4, and descriptions thereof will be omitted.

As illustrated in FIG. 9, when the service status notification processing is started, the capturing unit 11 outputs a captured image of the inside of the facility to the object detecting unit 15 (step S1), and the object detecting unit 15 executes processing of step S2-1.

(Step S2-1)

At step S2-1, as in the above second embodiment, the object detecting unit 15 searches for whether or not any service object (any of the service objects 131, 133, and 135 illustrated in FIG. 2) is included in the captured image. When the object detecting unit 15 determines that any of the service objects is included in the captured image, the object detecting unit 15 proceeds to processing of step S30. On the other hand, when the object detecting unit 15 determines that none of the service objects is included in the captured image, the object detecting unit 15 outputs information indicating that none of the service objects 131, 133, and 135 has been detected (nondetection information) to the time limit setting unit 16. Upon input of the nondetection information, the time limit setting unit 16 executes the time limit cancellation processing of step S10. The time limit cancellation processing executed in the present embodiment is the same processing as the time limit cancellation processing (see FIG. 5) executed in the above first embodiment.

(Step S30)

At step S30, when the object detecting unit 15 determines that the service content is "discount", the object detecting unit 15 adds information (current position information) indicating a current position of the service object to the detection information, and outputs to the time limit setting unit 16. Then, the time limit setting unit 16 proceeds to the processing of step S3. On the other hand, when the object detecting unit 15 determines that the service object 135 whose service content is "discount" has not been detected, the object detecting unit 15 ends the service status notification processing, without executing the pieces of processing of step S3 and subsequent steps.

When the time limit setting unit 16 determines at the step S3 that a validity time limit time point of the service has not been set (No at step S3), the time limit setting unit 16 sets the service validity time limit at step S4, and proceeds to processing of step S31. On the other hand, when the time limit setting unit 16 determines at step S3 that the validity time limit time point of the service has been set (Yes at step S3), the time limit setting unit 16 proceeds to processing of step S32.

(Step S31)

At step S31, the time limit setting unit 16 registers the content of the current position information of the service object in the predetermined storage area on the processing computer, and proceeds to the processing of step S7. As a result, in the validity period of the discount service, it can be determined whether or not the service object is deviated from the position at the time of start of the discount service.

(Step S32)

At step S32, similarly to step S21 (see FIG. 8), the time limit setting unit 16 determines whether or not the position of the service object in the captured image is deviated from a position (previous position) of the service object at the time of previous service status notification processing. The time limit setting unit 16 compares position the information (current position information) of the service object included in the detection information input from the object detecting unit 15 with the previous position information, and determines whether both are not coincident, i.e., whether or not there is any deviation between the position of the service object included in the current position information and the position of the service object included in the previous position information. When the time limit setting unit 16 determines that there is a deviation between the position of the service object included in the current position information and the position of the service object included in the previous position information, the time limit setting unit 16 proceeds to the processing of step S33. On the other hand, when the time limit setting unit 16 determines that the current position information is coincident with the previous position information, and there is no positional deviation of the service object during a time from the previous service status notification processing to the present service status notification processing, the time limit setting unit 16 proceeds to the processing of step S5.

(Step S33)

At step S33, regardless of whether or not the validity period of the service has expired, the time limit setting unit 16 resets the value of the validity time limit time point of the service and the value of the time limit information stored in the predetermined storage area in order to cancel the service validity time limit, similarly to step S10-3 (see FIG. 6), and then proceeds to the processing of step S8. As a result, based on the positional deviation of the service object, the discount service is ended.

As described hereinabove, in the service status notification processing in the present embodiment, the position of the service object is registered upon start of provision of the discount service in the service providing facility (step S31), and due to the positional deviation of the service object in the validity period of the service (Yes at step S32), the service validity time limit is cancelled, and the discount service is ended.

Thus, the service status management system 1 according to the present embodiment invalidates the discount service when the positional deviation of the service object is detected. Specifically, the service status management system 1 according to the present embodiment does not reset the service validity time limit, unlike the second embodiment in which the movement of the service object is detected, and ends the service regardless of the service validity time limit. By doing this, when the service object linked to the discount service is moved by a mischief or the like, the service status management system 1 according to the present embodiment can prevent postponement of the validity time limit of the discount service that is not the intention of the service providing facility side or starting of a fake discount service using a fake service object brought in by a malicious third party that is not a service provider.

Modification of Third Embodiment

In addition, the service status management system 1 according to the present embodiment may be configured to reset and re-register the position information of the service object linked to the discount service every time the service status management system 1 is started up. For example, position registration processing of the service object (step S31) maybe executed only when the validity time limit of the discount service is set initially (step S4) after the start of operation of the service providing facility. By doing this, based on whether or not the position of the service object is deviated from the initial position of the service object after the start of operation thereof, the discount service can be ended, which can more surely prevent postponement of the validity time limit of the discount service that is not the intention of the service providing facility side, caused by a mischief or the like. Note that the timing for registration of the position information of the service object is not limited to every startup, and may be set on a daily, weekly, monthly, or yearly basis by using a timer. In addition, when registering the position information, a time difference may be provided between a time point of the initial detection of the service object and a time point of the start of the service, and it may be determined whether or not the position of the service object is stable in the time difference.

Fourth Embodiment

Next, a description will be given of a service status management system according to a fourth embodiment of the present invention. The service status management system according to the present embodiment is different from the service status management system 1 in that the former system includes a background image registering unit 41 as a component of the system. Additionally, since the service status management system according to the present embodiment includes the background image registering unit 41, the facility image in the notification image to be transmitted at step S9 of the service status notification processing (see FIG. 4) is different from that in the service status management system 1 according to the first embodiment. However, except for these points, it has the same structure and the same functional effects as those of the service status management system 1 according to the first embodiment. Accordingly, hereinafter, in the service status management system according to the present embodiment and components of the service status management system, the components having the same functions and effects as those of the service status management system 1 illustrated in FIG. 1 are denoted by the same reference signs, and descriptions thereof will be omitted.

Figure 10:
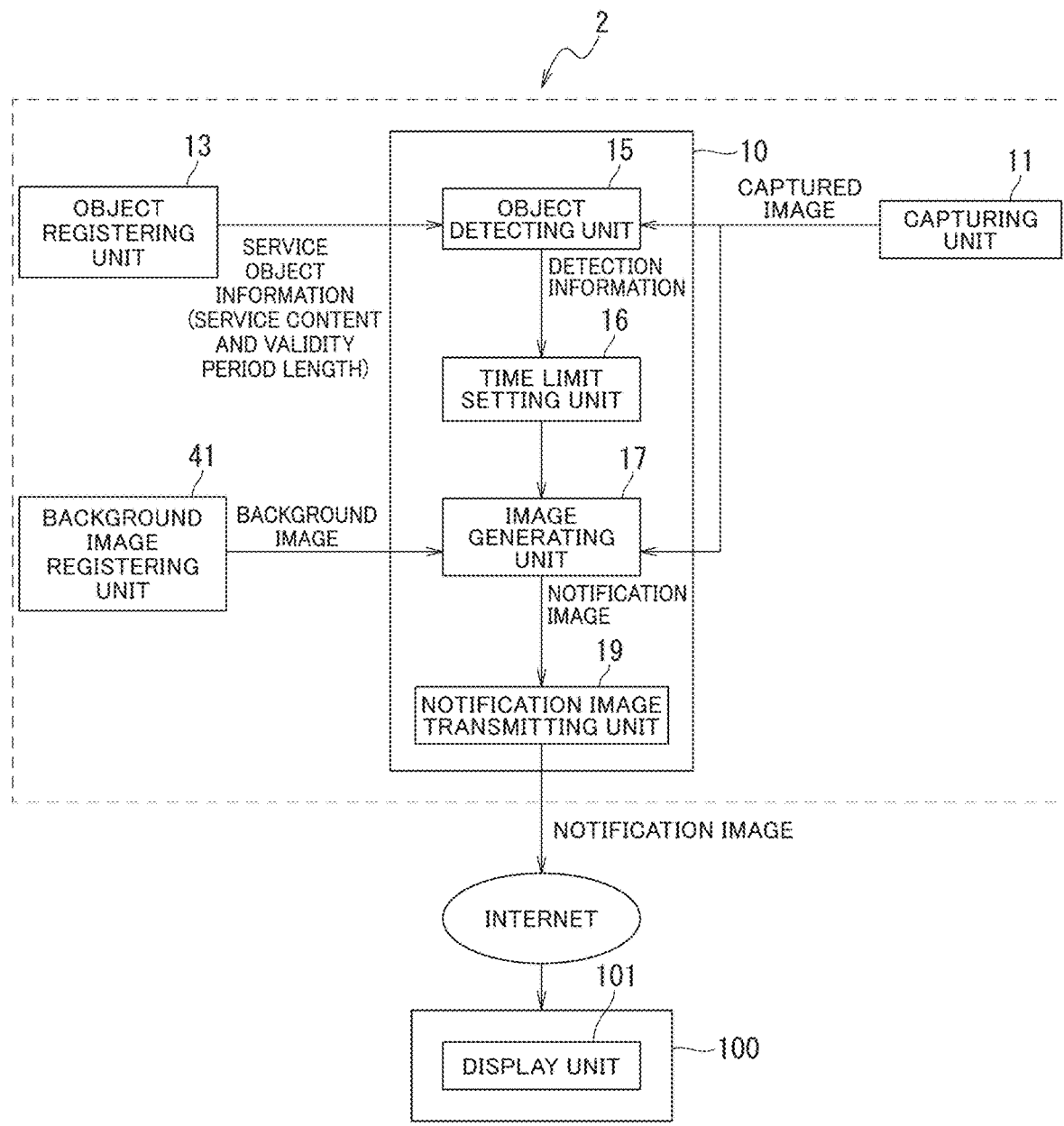
FIG. 10 is a structural diagram for describing a service status management system 2 according to a fourth embodiment of the present invention.

Now, the service status management system according to the present embodiment will be described using FIG. 10 and FIGS. 11A to 11C. FIG. 10 is a structural diagram for describing a service status management system 2 according to the present embodiment.

The service status management system 2 includes the background image registering unit 41 configured to previously register, as a background image, an image in the service providing facility that does not include any service object. The background image in the present embodiment is a still image of the inside of the service providing facility previously captured by the capturing unit 11 in a state where the service provider has confirmed that there is no service object in the angular field of view to be captured. The background image registering unit 41 is a predetermined storage area on a processing computer, such as a memory, as in the object registering unit 13. In addition, in the service status management system 2, pixels with no change in a plurality of pieces of captured images captured by the capturing unit 11 in a certain period may be determined as pixels not included in the service object, and the corresponding pixels in the background image registered in the background image registering unit 41 maybe replaced with the pixels. Updating of the background image is automatically performed without confirmation by the service provider.

Figure 11A:
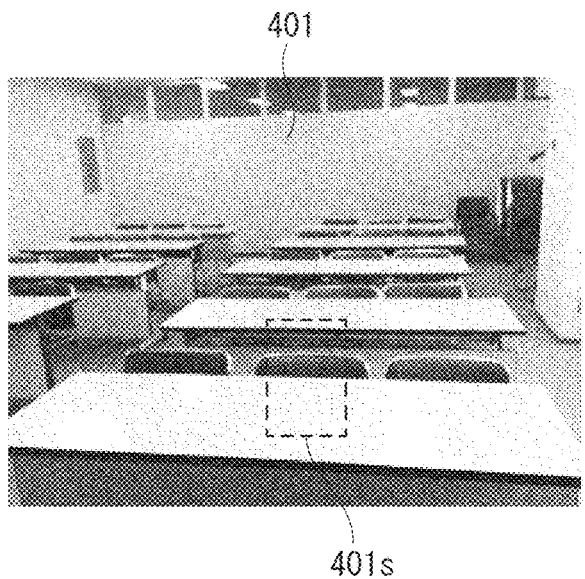
FIGS. 11A to 11C are diagrams describing one example of a facility image generating method in the fourth embodiment of the present invention.
Figure 11B:
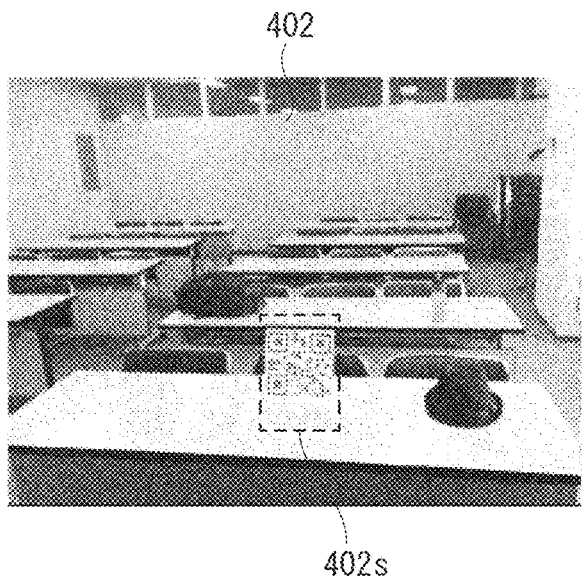
Figure 11C:
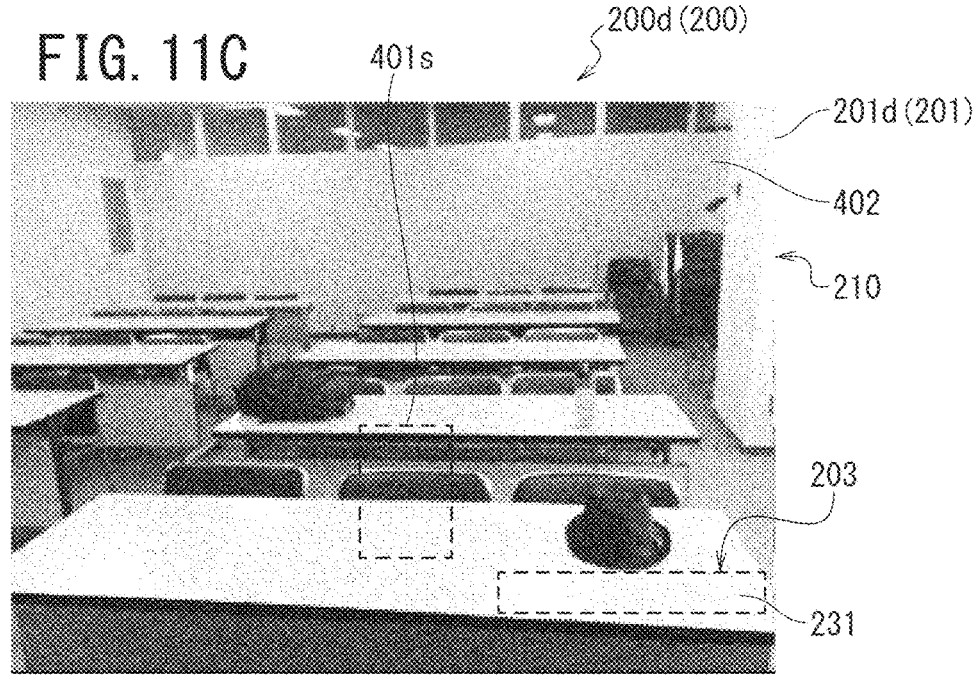

FIGS. 11A to 11C are diagrams describing one example of a method for generating a facility image in the present embodiment. The facility image in the present example is a facility image in a case where the service validity time limit has expired. FIG. 11A is a diagram illustrating one example of the background image registered in the background image registering unit 41. A background image 401 is, for example, an image obtained by capturing the inside of the service providing facility with no customers and no service object while outside business hours or the like of the service providing facility. FIG. 11B is a diagram illustrating one example of a captured image captured at step S1 of the service status notification processing (see FIG. 4). The background image 401 is an image obtained by capturing the inside of the facility in the same angular field of view from the same position as that of a captured image 402. Thus, the background image 401 has a composition similar to that of the captured image 402.

FIG. 11C is a diagram describing one example of the facility image in the present embodiment (a facility image in the case where the service validity time limit has expired). A facility image 201d in the present embodiment is generated by combining the background image 401 with the captured image 402. More specifically, when the object detecting unit 15 detects a service object (Yes at step S2), and the time limit setting unit 16 determines that the service validity time limit has expired (Yes at step S5), the image generating unit 17 generates, as the facility image 201d, an image obtained by replacing an area 402s (see FIG. 11B) where the service object is positioned in the captured image 402 with an image of an area 401s at the same position in the background image 401, and displays in the facility image area 210. The facility image 201d is generated, for example, immediately before transmitting the notification image at step S9 (see FIG. 4). Additionally, in the processing of step S8 (see FIG. 4), the image generating unit 17 deletes the time limit information in the time limit information image 231 displayed in the time limit area 203. In this way, in the service status management system 2 according to the present embodiment, a notification image 200d in which the service object and the time limit information are hidden is transmitted to the terminal device 100 of potential visitors. In the notification image 200d of the present example, the service object is hidden in the facility image 201d. Thus, it is unnecessary to display a character string image "Reservation Service Ended" indicating expiration of the service validity time limit in the time limit area 203. In the present example, the generation of the notification image 200d by the image generating unit 17 refers to the generation of the facility image 201d and the time limit information image 231.

As a result, the service status management system 2 according to the present embodiment can more clearly notify the status where the validity period of the service has ended to the potential visitors, as if the service had not been provided, which is very effective for reservation service.

Modification 1 of Fourth Embodiment

The notification image transmitted in the service status management system 2 according to the present embodiment is not limited to the notification image 200d. Now, using FIGS. 12A to 12C, a description will be given of a notification image 200e that is generated in a modification 1 of the fourth embodiment.

Figure 12A:
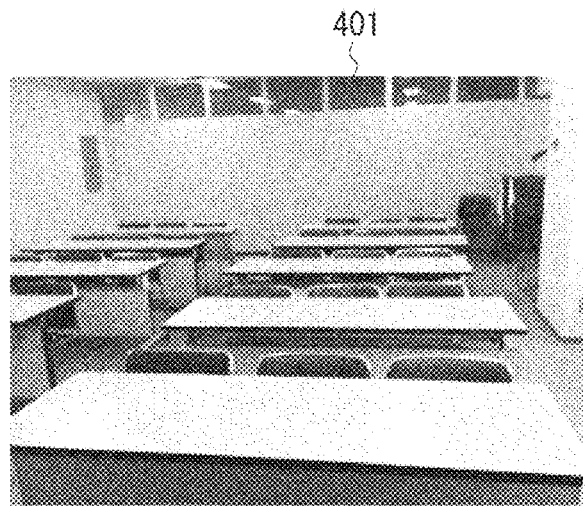
FIGS. 12A to 12C are diagrams describing one example of a facility image generating method in a modification 1 of the fourth embodiment of the present invention.
Figure 12B:
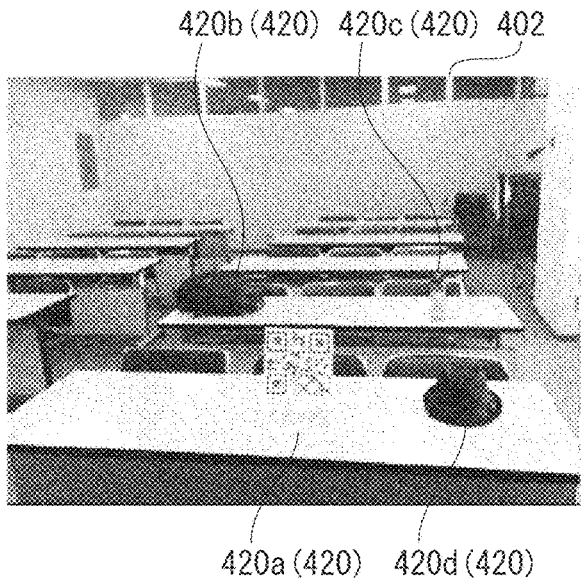
Figure 12C:
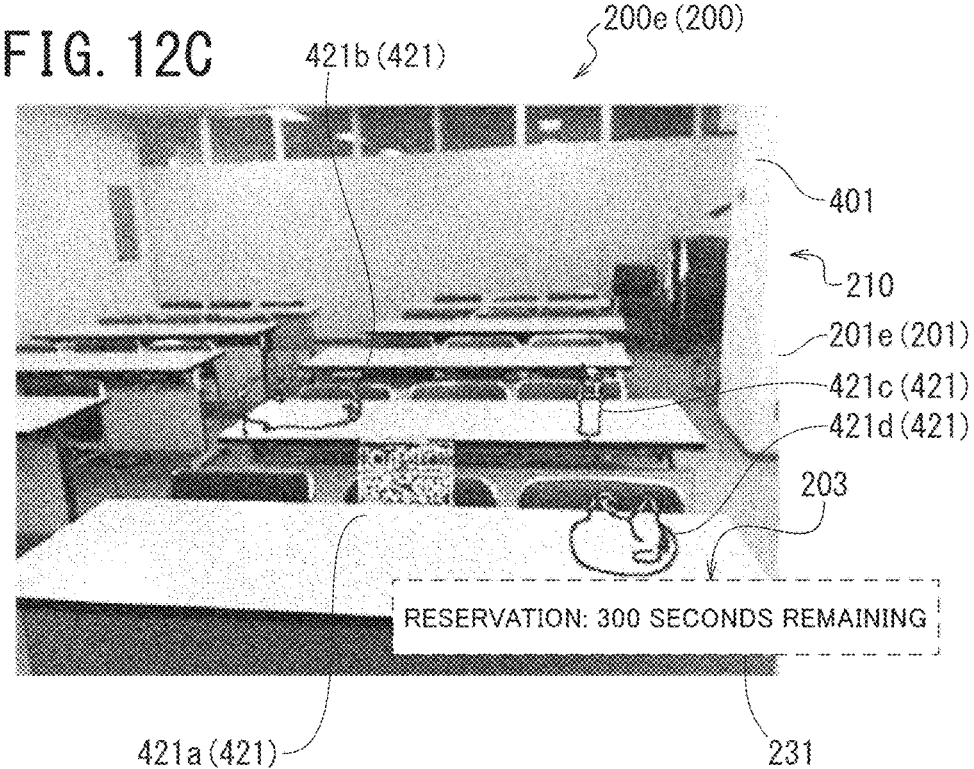

FIGS. 12A to 12C are diagrams describing one example of a method for generating a facility image in the present modification. FIG. 12A is a diagram illustrating a background image 401 similar to that illustrated in FIG. 11A. FIG. 12B is a diagram illustrating a captured image 402 captured in a composition similar to that illustrated in FIG. 11B. In FIG. 12B, images that are not included in the background image 401 but are included in the captured image 402, i.e., an image of a difference between the captured image 402 and the background image 401 is illustrated as foreground images 420 (420a, 420b, 420c, and 420d). Herein, the foreground images 420 includes the foreground image 420a as the image of the service object and the foreground images 420b, 420c, and 420d as images of mobile objects other than the service object. The foreground images 420b, 420c, and 420d are, for example, images of belongings or the like of visitors visiting the service providing facility, which are images of objects used to indicate that tables or seats are reserved by leaving the objects at the tables or seats. In addition, although not illustrated in FIG. 12B, the foreground images 420 also include person (s) (such as visitor (s) and/or employee(s)) who are in the service providing facility. Additionally, FIG. 12C is a diagram illustrating one example of the notification image 200e in a case where the service validity time limit in the present modification has not expired.

In the present modification, the image generating unit 17 extracts data representing edge lines of the foreground images 420 that is the image of the difference between the captured image 402 and the background image 401 right before transmitting the notification image at step S9 (see FIG. 4). For example, the image generating unit 17 calculates differences in lightness and hue between adjacent pixels in the foreground images 420, and extracts, as edge lines, a series of pixels exceeding a certain threshold. In the present example, the captured image 402 does not include any person. However, if the captured image 402 includes any person, all objects and persons included in the captured image 402 are extracted as edge lines. Additionally, even by calculating a difference between the edge lines of the captured image 402 and the edge lines of the background image 401, the edge lines of the foreground images 420 can be similarly obtained. Alternatively, by generating a mask image in which the difference between the captured image 402 and the background image 401 is divided into 1 or 0 by a previously determined threshold and then performing mask processing of the edge lines of the captured image 402, the edge lines of the foreground images 420 can be obtained.

Next, the image generating unit 17 generates, as the facility image 201e to be displayed in the facility image area 210, an image obtained by writing the edge lines of the foreground images 420 that is the image of the difference between the captured image 402 and the background image 401 over the background image 401. As illustrated in FIG. 12C, in the notification image 200e, regardless of whether or not the service validity time limit has expired, the foreground images 420 (the foreground images 420a, 420b, 420c, and 420d) illustrated in FIG. 12B are written as respective edge line images 421 (edge line images 421a, 421b, 421c, and 421d) over the background image 401 to form the facility image 201e in the facility image area 210. Additionally, each of the edge line images 421 in the facility image 201e is written over an area on the background image 401 corresponding to the same position as that of each area showing each of the foreground images 420 in the captured image 402. Additionally, in the notification image 200e in the case where the service validity time limit has not expired, the time limit information image 231 displaying time limit information (a remaining time in the present modification) is displayed in the time limit area 203, similarly to that illustrated in FIG. 3. In the present modification, the generation of the notification image 200e by the image generating unit 17 refers to the generation of the facility image 201e and the time limit information image 231.

Thus, in the service status management system 2 according to the present modification, the notification image 200e including the facility image area 210 displaying the facility image 201e generated by writing the edge lines of the foreground image 420 over the background image 401 and the time limit area 203 displaying the time limit information image 231 is transmitted to the terminal device 100 of potential visitors. In the service status management system 2 according to the present modification, since each object and person included in the captured image 402 are drawn by edge lines drawing, a person who is in the service providing facility cannot be identified by the belongings, face, and the like. This allows protection of privacy of those who are in the service providing facility, particularly, of visitors. Additionally, as described above, the service status management system 1 in the present invention executes the service status notification processing, for example, 4 times per second, i.e., at an interval of 0.25 seconds. Accordingly, the notification image also is transmitted to the terminal device 100 at the interval of 0.25 seconds. As a result, the motion of the person who is in the service providing facility is displayed in a frame-by-frame manner on the display unit 101 of the terminal device 100, so that the person cannot be identified by the motion (such as a walking manner or gestures), so that the privacy of the visitor can be more surely protected.

The conventional system (for example, the technology disclosed in PTL 1) uses a current image of a predetermined facility (such as a restaurant) captured by a camera and a previously captured image (background image) of the facility to generate an image by writing a foreground edge lines that is a difference between both images over the background image. Then, without invading privacy by the generated image, a crowded condition of the predetermined facility is displayed on terminal devices connected through a network. captured However, the service status management system 2 according to the present embodiment can transmit a notification image notifying a service content provided in a service providing facility and a validity period of the service to the terminal device 100, while protecting privacy. Thus, the service status management system 2 can further improve accuracy in the notification of a service status to potential visitors and in the management of the service status on the facility side, as compared to the conventional system.

In addition, when the time limit setting unit 16 determines that the service validity time limit has expired, the image generating unit 17 may generate a notification image indicating expiration of the service validity time limit by deleting, at step S8 (see FIG. 4), the time limit information from the time limit information image 231 displayed in the time limit area 203 of the notification image 200e illustrated in FIG. 12C, or, for example, displaying the character string image "Reservation Service Ended" clearly indicating that the service validity time limit has expired.

Modification 2 of Fourth Embodiment

Figure 13:
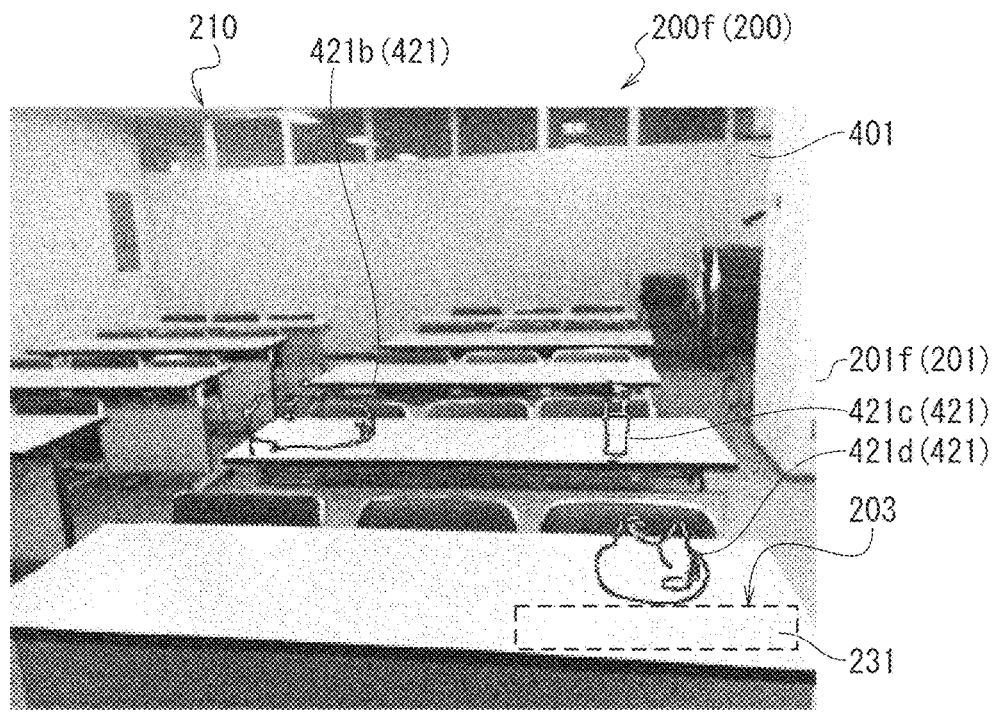
FIG. 13 is a diagram describing one example of a facility image generating method in a modification 2 of the fourth embodiment of the present invention.

Next, with reference to FIG. 4 and FIGS. 12A to 12C, a description will be given of a facility image 201f generated in a modification 2 of the fourth embodiment by using FIG. 13. FIG. 13 is a diagram illustrating one example of the facility image 201f and the time limit information image 231 in the present modification. The facility image 201f of the present modification is a facility image in the case where the service validity time limit has expired.

In the present modification, similarly to the above modification 1, the image generating unit 17 extracts the edge lines of the foreground image 420 by using the background image 401 and the captured image 402 illustrated in FIG. 12B, and writes it over the background image 401 to generate the facility image 201f. In the present modification, however, when the object detecting unit 15 detects the service object (Yes at step S2) and the time limit setting unit 16 determines that the service validity time limit has expired (Yes at step S5), the image generating unit 17 does not write the edge lines (the edge line image 421a) of the service object included in the foreground image 420 over the background image 401 when generating the facility image 201f. In the present modification, the facility image 201f is generated, for example, immediately before transmitting the notification image at step S9 (see FIG. 4). As a result, in the present modification, a notification image 200f including the facility image area 210 displaying the facility image 201f generated by overwriting the edge line images 421b, 421c, and 421d except for the edge line image 421a (see FIG. 12C) that is the edge lines of the service object and the time limit area 203 displaying the time limit information image 231 from which the time limit information has been deleted, as illustrated in FIG. 13, is transmitted to the terminal device 100 of potential visitors. In the present modification, the generation of the notification image 200f by the image generating unit 17 refers to the generation of the facility image 201f and the time limit information image 231.

As a result, the service status management system 2 according to the present modification can, while protecting privacy of visitors, more clearly notify the status where the validity period of the service has ended to the potential visitors, as if the service had not been provided. This is very effective for reservation service.

Modification 3 of Fourth Embodiment

Figure 14:
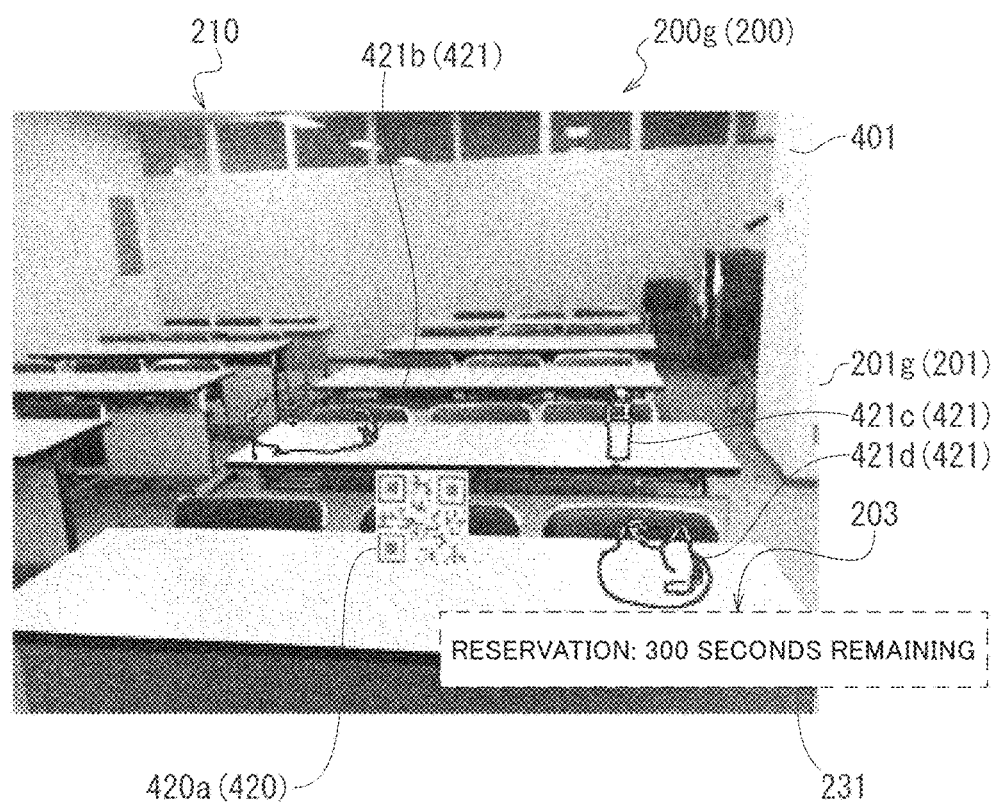
FIG. 14 is a diagram describing one example of a facility image generating method in a modification 3 of the fourth embodiment of the present invention.

Next, with reference to FIG. 4 and FIGS. 12A to 12C, a description will be given of a facility image 201g generated in a modification 3 of the fourth embodiment by using FIG. 14. FIG. 14 is a diagram illustrating one example of the facility image 201g in the present modification.

In the present modification, similarly to the above modification 1, the image generating unit 17 extracts the edge lines of the foreground image 420 by using the background image 401 and the captured image 402 illustrated in FIG. 12B, and writes it over the background image 401 to generate the facility image 201g. In the present modification, however, when the object detecting unit 15 detects the service object (Yes at step S2 of FIG. 4) and the time limit setting unit 16 determines that the service validity time limit has not expired (No at step S5 of FIG. 4), the image generating unit 17 writes the foreground image (the foreground image 420a) of the service object over the background image 401, and does not write the edge line image (the edge line image 421a) of the service object over the background image 401 when generating the facility image 201g. In the present modification, the facility image 201g is generated, for example, immediately before transmitting the notification image at step S9 (see FIG. 4). As a result, in the present modification, a notification image 200g including the facility image area 210 displaying the facility image 201g generated by overwriting the foreground image 420a and the edge line images 421b, 421c, and 421d and the time limit area 203 displaying the time limit information image 231, as illustrated in FIG. 14, is transmitted to the terminal device 100 of potential visitors. In the present modification, the generation of the notification image 200g by the image generating unit 17 refers to the generation of the facility image 201g and the time limit information image 231.

In the service status management system 2 according to the present modification, the service object is displayed not by edge lines but in the same state as it is shown in the captured image 402. This allows color(s) and a shape of the service object to be transmitted to the terminal device 100 of the potential visitors. Thus, when the service object is a panel (for example, a sign panel) or the like indicating the service content by color and shape, the potential visitors can intuitively grasp the service content currently provided in the service providing facility. In the system, it is also possible to replace the foreground image 420a by a previously registered another image. However, when users who have viewed using the terminal device 100 actually visit the facility, the service object is placed therein, so that using the foreground image 420a gives more comfort to the users.

While the modifications of the facility image displayed in the facility image area 210 included in the notification image have been described above, modifications of the facility image are not limited to the modifications 1 to 3. The facility image may be generated from at least either one or more captured images previously captured by the capturing unit 11 or one or more captured images including a time point of capturing of the captured image(s) in which a service object has been detected and captured in the past. Furthermore, the facility image does not have to include any captured image captured by the capturing unit 11. The facility image may be an image of the inside of a service providing facility captured, for example, by a camera other than the capturing unit 11, and may be generated by an image having a composition similar to that of a captured image captured by the capturing unit 11. In addition, the facility image is not limited to captured image(s), and may be generated using a sketch, an illustration, or a schematic diagram having a composition similar to that of the captured image captured by the capturing unit 11.

Fifth Embodiment

Next, a description will be given of a service status management system according to a fifth embodiment of the present invention. The service status management system according to the present embodiment is different from the service status management system 1 in that the former system includes a terminal position information receiving unit 51 as a component of the system. Hereinafter, in the service status management system according to the present embodiment and components of the service status management system, the components having the same functions and effects as those of the service status management system 1 illustrated in FIG. 1 are denoted by the same reference signs, and descriptions thereof will be omitted.

Figure 15:
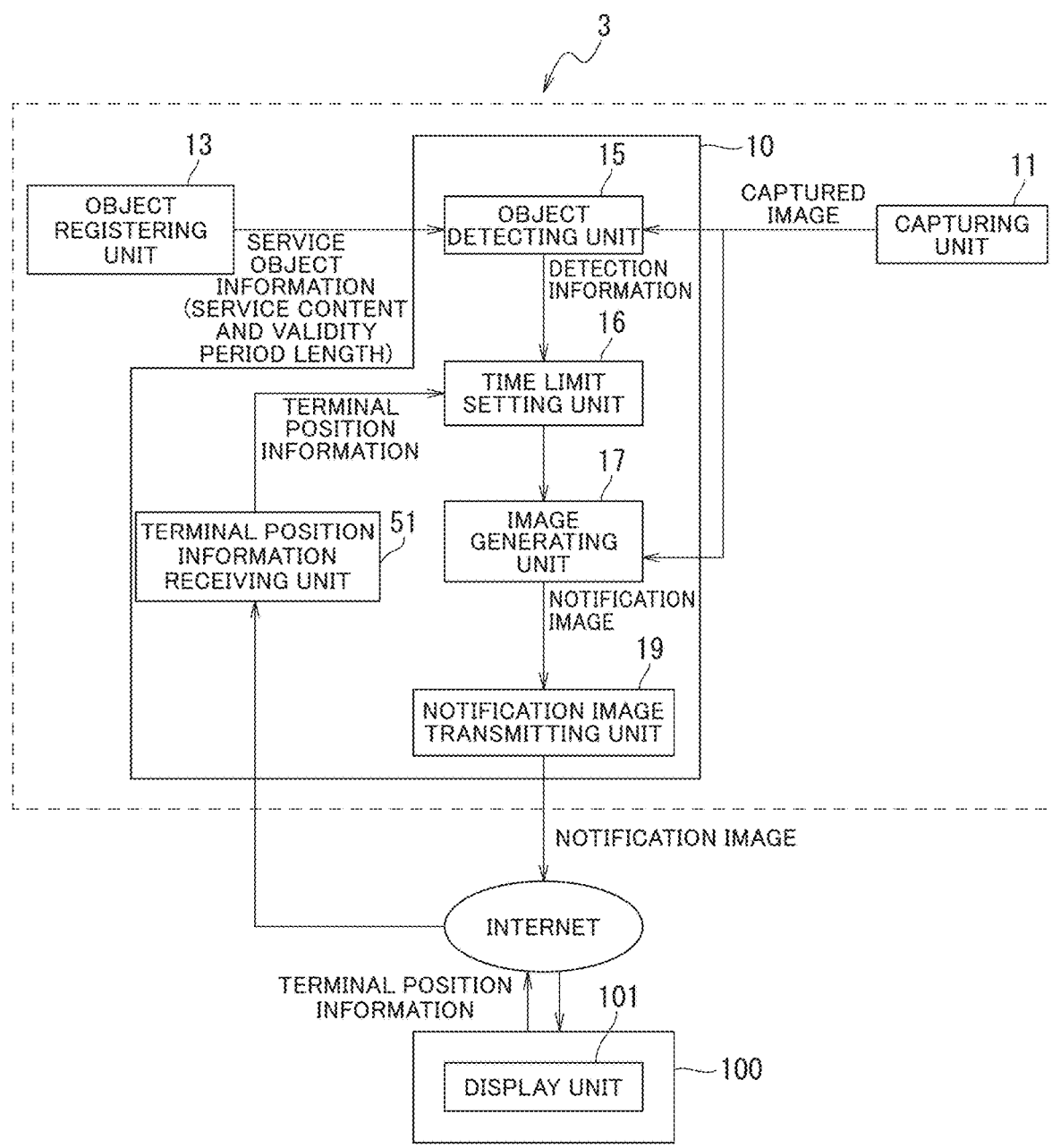
FIG. 15 is a structural diagram for describing a service status management system according to a fifth embodiment of the present invention.

Now, the service status management system according to the present embodiment will be described using FIG. 15. FIG. 15 is a structural diagram for describing a service status management system 3 according to the present embodiment.

The service status management system 3 includes, in the processing unit 10, the terminal position information receiving unit 51 configured to receive position information of the terminal device 100 transmitted from the terminal device 100. The terminal device 100 also transmits a current position information together to the service status management system 3, in cases such as, for example, at the first time when the terminal device 100 requests a transmission of a notification image of a discount service or a reservation service. Upon receipt of the position information from the terminal device 100, the terminal position information receiving unit 51 stores the position information in the predetermined storage area on the processing computer. In the discount service, the terminal device 100 may transmit, as user identification information, for example, an IP address of the terminal device 100 when transmitting the position information, and the user identification information together with the position information may be stored in the predetermined storage area on the processing computer. Additionally, after having received the terminal position information, the terminal position information receiving unit 51 calculates a distance from the terminal device 100 to the service providing facility, and stores it as terminal device distance information in the predetermined storage area on the processing computer.

In the present embodiment, the time limit setting unit 16 acquires the terminal position information stored by the terminal position information receiving unit 51, for example, when setting the validity time limit of a reservation service at step S4 (see FIG. 4). As a result, the time limit setting unit 16 can set the validity time limit of the reservation service on the basis of the validity period length and the terminal position information registered in the service object registration table (see FIG. 2). For example, the time limit setting unit 16 adds a time obtained by adding up the validity period length registered in the service object registration table and a previously determined terminal position adjustment time to a detection time point to set a validity time limit time point. It is set such that an addition is made to the terminal position adjustment time depending on a value of the terminal device distance information calculated by the terminal position information receiving unit 51, and the terminal position adjustment time is stored in the predetermined storage area on the processing computer. For example, 1 minute is added to the terminal position adjustment time by every 100 m up of the terminal device distance information.

For example, assume that the service object 131 whose validity period length registered in the service object registration table is "5 minutes" has been detected by the object detecting unit 15, and the value of the terminal device distance information calculated by the terminal position information receiving unit 51 is "300 m". In the present example, when the value of the terminal device distance information is "300 m", the corresponding terminal position adjustment time is 1 minute×3=3 minutes. Therefore, the time limit setting unit 16 adds 8 minutes (=5 minutes+3 minutes) to a detection time point to set a validity time limit time point of the service.

Thus, the service status management system 3 according to the present embodiment can change the validity period length of the reservation service for each user (prospective visitor) depending on the position of their terminal devices 100. By doing this, the service status management system 3 can improve the possibility of acquiring potential visitors who are positioned away from the service providing facility.

In addition, the service status management system 3 according to the present embodiment may include, in the processing unit 10, a discount rate setting unit configured to set a discount rate in a discount service depending on the position of the terminal device 100. In the service status management system 3 according to the present embodiment, for example, when a request for transmission of a notification image is input from the terminal device 100 within the validity period of a discount service, the discount rate setting unit sets a terminal position adjustment discount rate on the basis of the terminal device distance information. The terminal position adjustment discount rate is determined depending on, for example, the range of the value of the terminal device distance information calculated by the terminal position information receiving unit 51, and is stored in the predetermined storage area on the processing computer. For example, it is set such that a terminal position adjustment discount rate corresponding to a range of terminal device distance information of from "300 m" to less than "500 m" is "plus an additional 3%", a terminal position adjustment discount rate corresponding to a range of terminal device distance information of from "500 m" to less than "1000 m" is "plus an additional 5%", and a terminal position adjustment discount rate corresponding to a range thereof of "1000 m or more" is "plus an additional 10%".

For example, assume that the previously determined discount rate is "10%", and the value of the terminal device distance information calculated by the terminal position information receiving unit 51 is "500 m". In the present example, when the value of the terminal device distance information is "500 m", the corresponding terminal position adjustment discount rate is "plus an additional 5%", so that the discount rate setting unit sets a discount rate available to the user (potential visitor) of the terminal device 100 to 15% (=10%+5%). The discount rate set in this case is applied only to the terminal device 100 that is a transmission source of the terminal position information used to calculate the terminal position adjustment discount rate. Thus, in the present example, a notification image displaying a discount rate corresponding to each terminal position information in the time limit information image 231 (see FIG. 3) is transmitted to each terminal device 100. In other words, the discount rate varies depending on each potential visitor. The user of the terminal device 100 can use, for example, a screenshot function of smartphone to store a copy of the notification image on the terminal device 100 as a proof that the discount service has been provided. When the user of the terminal device 100 comes near the service providing facility, the displayed discount rate is reduced to 10%. However, by showing the copy of the notification image (for example, the screenshot of the notification image displaying the discount rate of 15%) to the service provider (employee or store keeper) of the service providing facility, the discount rate displayed on the copy of the notification image is applied.

Thus, the service status management system 3 according to the present embodiment can change the discount rate in the discount service for each user (potential visitor) of the terminal device 100 depending on the position of the terminal device 100. By doing this, the service status management system 3 can enhance the motivation of potential visitors to visit, and thereby can improve the possibility of acquiring potential visitors who are positioned away from the service providing facility.

Additionally, the service status management system 3 according to the present embodiment may be configured such that the map information is previously registered in a predetermined storage area, and the discount rate is set on the basis of the map information and the terminal position information. For example, the service status management system 3 may be configured such that information of an area where many competing stores exist (specific area information) is set in advance, and the discount rate setting unit uses both the terminal device distance information and the map information. The discount rate setting unit sets a terminal position adjustment discount rate on the basis of a positional relationship between the position of the terminal device 100 and the specific area information. For example, in the above-mentioned example, when the value of the terminal device distance information is "500 m", the corresponding terminal position adjustment discount rate is "plus an additional 5%". Now, when the position of the terminal device 100 obtained from the terminal position information is in the specific area or in an area passing through the specific area to visit the service providing facility, the discount rate setting unit further adds, for example, "10%" to the terminal position adjustment discount rate. As a result, the discount rate setting unit sets a discount rate available to the user (potential visitor) of the terminal device 100 to "25%" obtained by adding the terminal position adjustment discount rate "15%" (=5%+10%) to the previously determined discount rate (10%). Note that the terminal position adjustment discount rate added on the basis of the specific area information is not limited to 10%. In addition, a plurality of terminal position adjustment discount rates to be added may be set in association with a distance of the terminal device 100 from the specific area, or the like.

As a result, the service status management system 3 according to the present embodiment can enhance the motivation of potential visitors to visit the service providing facility from within the specific area or an area located such that the specific area is positioned between the area and the service providing facility, and thereby can improve the possibility that the service providing facility can acquire the potential visitors.

Additionally, in the service status management system 3 according to the present embodiment, the terminal position information receiving unit 51 may be configured to store a time point (access time point) at which the terminal device 100 made the request for transmission of the notification image and use of the discount service in the predetermined storage area. The time limit setting unit 16 may set a validity time limit time point of the discount service on the basis of the access time point and the terminal position information. In addition, the service status management system 3 may be configured such that the terminal position information, the access time point, and user identification information can be viewed on the processing computer and on a terminal device in the service providing facility connected to the processing computer. In this case, even when a visitor who has viewed the notification image or the like in the terminal device 100 within the validity period of the discount service visits after the validity period of the discount service, the user does not have to show the copy of the notification image (screenshot), and the discount service can be provided by confirming that the access time point was within the validity period of the discount service.

Additionally, in the service status management system 3 according to the present embodiment, the discount rate setting unit may be provided not in the processing unit 10, but in the terminal device in the service providing facility (a facility-side terminal device) connected to the processing computer. The facility-side terminal device may be provided with, for example, a contactless type IC card reading function. Then, when the user of the terminal device 100 visits, the facility-side terminal device may read a contactless type IC card incorporated in the terminal device 100, and acquire the terminal device distance information of the terminal device 100 stored in the predetermined storage area on the processing computer to set a terminal position adjustment discount rate corresponding to the terminal device distance information of the terminal device 100.

In addition, the service status management system 3 according to the present embodiment may include a distributing unit configured to distribute a program for storing terminal position information and an access time point in the terminal device 100 to the terminal device 100. A potential visitor makes access to the service status management system 3 in advance by the terminal device 100, and receives distribution of the program from the distributing unit. By storing terminal position information and an access time point at the time of access to the service status management system 3 in the terminal device 100, the visitor can, for example, show the terminal position information and the access time point to an employee of the service providing facility and can use service (such as discount service).

Furthermore, the service status management system 3 according to the present embodiment may include a visitor record storing unit configured to store a visitor record of each time zone. The visitor record storing unit is, for example, a predetermined storage area on a processing computer, such as a memory, like the object registering unit 13. The discount rate setting unit may refer to the visitor record storing unit, subtract a predetermined value from a previously determined discount rate value in a time zone with more visitors to reduce discount rate, and, in a time zone with less visitors, add a predetermined value to the discount rate value to increase discount rate.

Modifications

The service object in the present invention is not limited to those illustrated in FIG. 2. Additionally, the service object registration table may be configured such that the service provider (employee or storekeeper) of the service providing facility can additionally register a service object if necessary. For example, when additionally registering a service object, the service object to be added is captured, and the captured object image is added together with a service content and a validity period length to the service object registration table.

The service to be linked to the service object in the present invention is not limited to reservation service and discount service. The service object may be linked to a unique service proposed by a service providing facility.

In the present invention, for example, a plurality of service objects linked to reservation service may be arranged in the service providing facility. In this case, in the notification image, each time limit area is provided near each of the service objects to display a time limit information image that represents time limit information corresponding to each service object. This allows the service status management system according to the present invention to notify the statuses of reservation service of a plurality of tables to potential visitors and prospective visitors through the notification image.

Additionally, in the present invention, even during a period in which no service object is arranged in the service providing facility, a notification image for notifying the status of the inside of the service providing facility may be transmitted to terminal devices possessed by potential visitors. This allows the potential visitors to visit the service providing facility after confirming a crowded condition and the like (for example, there is no predetermined object left to surely get a seat at a table with nobody).

While some preferable embodiments and modifications of the present invention have been described with reference to the accompanying drawings, the invention is not limited to the embodiments and the like. It should be apparent that those skilled in the art could conceive of various modifications or alterations within the scope of the claims, and it is obviously understood that they also are within the technological scope of the invention. In addition, the above respective embodiments and modifications can be combined with each other as appropriate within a consistent range.

REFERENCE SIGNS LIST 1, 2, 3: Service status management system
10: Processing unit
11: Capturing unit
13: Object registering unit
15: Object detecting unit
16: Time limit setting unit
17: Image generating unit
19: Notification image transmitting unit
41: Background image registering unit
51: Terminal position information receiving unit
100: Terminal device
101: Display unit
131, 133, 135: Service object
200: Notification image
201: Facility image
203: Time limit area
203c: Time limit area
210: Facility image area
231: Time limit information image
401: Background image
402: Captured image
420: Foreground image
421: Edge line image

The invention claimed is:

1. A service status management system comprising:
a capturing unit configured to capture an image of an inside of a facility;
an object registering unit configured to previously register a service object linked to service information including a service to be provided in the facility and a validity period of the service;
an object detecting unit configured to detect the service object registered in the object registering unit in a captured image captured by the capturing unit;
a time limit setting unit configured to set a time limit of the validity period on the basis of a time point when the object detecting unit detected the service object for the first time;
an image generating unit configured to generate an image including a time limit area displaying a time limit information image representing information relating to the time limit and a facility image area displaying a facility image representing a state of the facility, the image to be generated being a notification image notifying a status of the service to an external terminal device; and
a notification image transmitting unit configured to transmit the notification image generated by the image generating unit to the terminal device,
wherein the image generating unit displays the time limit information image in the time limit area when the object detecting unit detects the service object, and the time limit setting unit determines that the time limit has not expired.

2. The service status management system according to claim 1, comprising a background image registering unit configured to previously store, as a background image, an image of the inside of the facility that does not include the service object, wherein when the object detecting unit detects the service object and the time limit setting unit determines that the time limit has expired, the image generating unit displays, in the facility image area, an image in which an area where the service object is positioned in the captured image has been replaced by an image of an area at the same position in the background image.

3. The service status management system according to claim 1, comprising a background image registering unit configured to previously store, as a background image, an image of the inside of the facility that does not include the service object, wherein the image generating unit displays, in the facility image area, an image obtained by writing edge lines of a foreground image that is an image of a difference between the captured image and the background image over the background image.

4. The service status management system according to claim 3, wherein when the object detecting unit detects the service object and the time limit setting unit determines that the time limit has expired, the image generating unit does not write edge lines of the service object included in the foreground image over the background image.

5. The service status management system according to claim 3, wherein when the object detecting unit detects the service object and the time limit setting unit determines that the time limit has not expired, the image generating unit writes the foreground image of the service object over the background image, and does not write the edge lines of the service object over the background image.

6. The service status management system according to claim 1, comprising a background image registering unit configured to previously store, as a background image, an image of the inside of the facility that does not include the service object, wherein when the object detecting unit detects the service object and the time limit setting unit determines that the time limit has expired, the image generating unit displays, in the facility image area, an image in which an area where the service object is positioned in the captured image has been replaced by an image of an area at the same position in the background image.

7. The service status management system according to claim 1, comprising a background image registering unit configured to previously store, as a background image, an image of the inside of the facility that does not include the service object, wherein the image generating unit displays, in the facility image area, an image obtained by writing edge lines of a foreground image that is an image of a difference between the captured image and the background image over the background image.

* * * * *